(12) United States Patent
Shimojo

(10) Patent No.: US 7,784,362 B2
(45) Date of Patent: Aug. 31, 2010

(54) TWO DIMENSIONAL LOAD DISTRIBUTION CENTER POSITION DETECTION SENSOR AND TWO DIMENSIONAL LOAD DISTRIBUTION CENTER POSITION DETECTION DEVICE

(75) Inventor: Makoto Shimojo, Tokyo (JP)

(73) Assignee: The University of Electro-Communications, Tokyo (JP)

( * ) Notice: Subject to any disclaimer, the term of this patent is extended or adjusted under 35 U.S.C. 154(b) by 156 days.

(21) Appl. No.: 12/097,211

(22) PCT Filed: Nov. 8, 2006

(86) PCT No.: PCT/JP2006/322294

§ 371 (c)(1),
(2), (4) Date: Jun. 12, 2008

(87) PCT Pub. No.: WO2007/069412

PCT Pub. Date: Jun. 21, 2007

(65) Prior Publication Data

US 2009/0183577 A1    Jul. 23, 2009

(30) Foreign Application Priority Data

Dec. 14, 2005    (JP)    ............................. 2005-360375

(51) Int. Cl.
  *G01D 7/00*    (2006.01)
(52) U.S. Cl. .............................. 73/862.041; 73/862.046
(58) Field of Classification Search .................................
  73/862.041–862.045, 760
See application file for complete search history.

(56) References Cited

U.S. PATENT DOCUMENTS

| 7,036,375 | B2 * | 5/2006 | Nozaki | 73/579 |
| 7,174,793 | B2 * | 2/2007 | Morimoto | 73/862.045 |
| 2005/0093452 | A1 * | 5/2005 | Lin et al. | 313/587 |
| 2005/0140248 | A1 * | 6/2005 | Kuniyasu et al. | 310/334 |
| 2007/0251574 | A1 * | 11/2007 | Fujimaki et al. | 136/263 |
| 2007/0297257 | A1 * | 12/2007 | Sekiguchi et al. | 365/214 |

FOREIGN PATENT DOCUMENTS

| JP | 60-35602 B2 | 2/1985 |
| JP | 64-61626 A | 3/1989 |
| JP | 6-5162 B2 | 1/1994 |
| JP | 6-58239 A | 3/1994 |
| JP | 2004-205482 A | 7/2004 |

* cited by examiner

*Primary Examiner*—Max Noori
(74) *Attorney, Agent, or Firm*—Sughrue Mion, PLLC

(57) ABSTRACT

For manufacturing a sensor covering a free-form surface, detection elements in which the electric resistance between a first electrode and a second electrode varies when a load is acted on, and cables 12 connecting the adjoining detection elements are provided. Each cable 12 connects a first electrode 21 of a first detection element 11-(i, j) to a first electrode 21 of a second detection element 11-(i+1, j) via first resistances 32-1 to 32-4, and connects a second electrode 22 of the first detection element 11-(i, j) to a second electrode of the second detection element 11-(i+1, j) via second resistances 32-5 to 32-8. The cables 12 can be deformed. The two dimensional load distribution center position detection sensor 2 can cover a free-formed surface. This sensor is easy to manufacture because an elaborate sheet-shaped resistor is not needed.

7 Claims, 18 Drawing Sheets

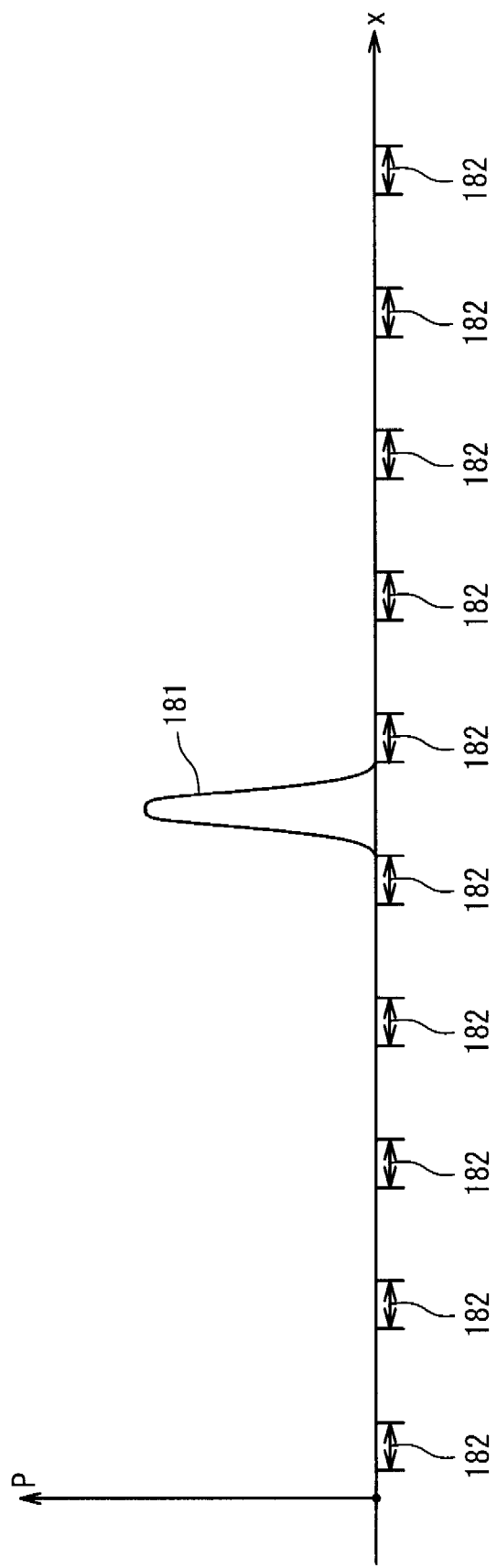

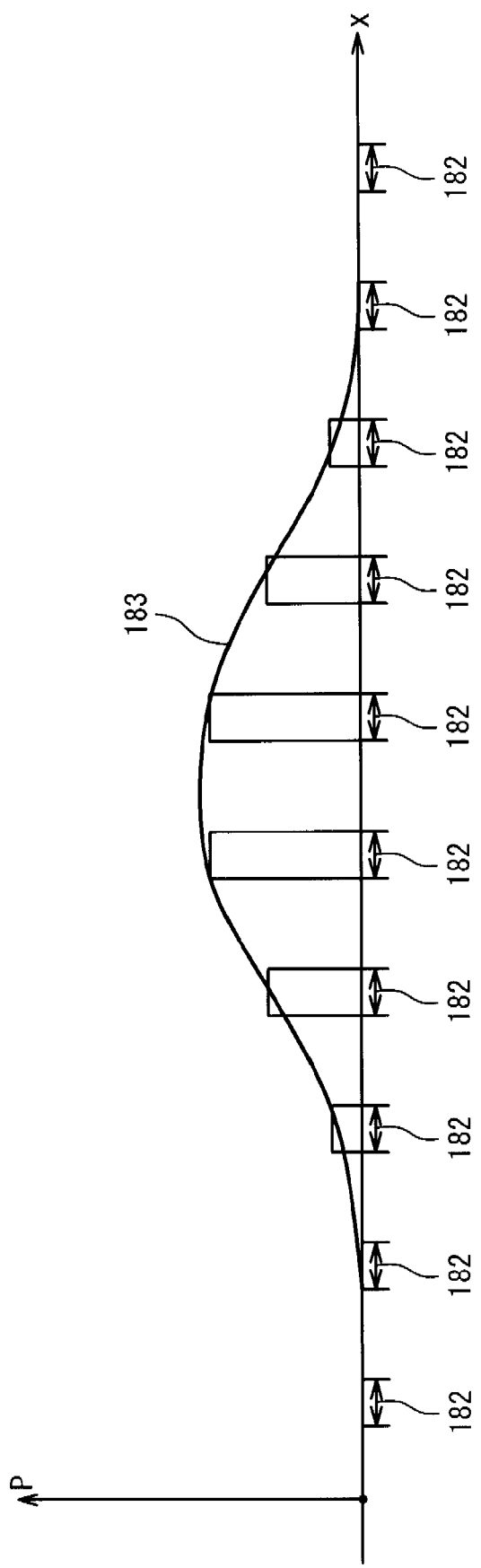

TWO DIMENSIONAL LOAD DISTRIBUTION CENTER POSITION DETECTION SENSOR AND TWO DIMENSIONAL LOAD DISTRIBUTION CENTER POSITION DETECTION DEVICE

TECHNICAL FIELD

The present invention relates to a two dimensional load distribution center position detection sensor and a two dimensional load distribution center position detection device, and especially relates to a two dimensional load distribution center position detection sensor and a two dimensional load distribution center position detection device which are used for calculating a load acting on a surface of an object and a center position of the load.

BACKGROUND ART

A two dimensional load distribution center position detection device which calculates the load acting on a sheet shaped sensor and the center position of the load is desired. Such a 2D load distribution center position detection device is applied for measuring the load and the barycentric position of the load of the bottom of a robot's feet by using the sensor covering the bottom of the feet. Or, such a 2D load distribution center position detection device is applied for measuring a load and the center position of the load acted on robot finger tips when the robot pinches an object by the finger tips covered by the sensor. Such a 2D load distribution center position detection device is desired to have a fine resolution in measuring a load and its central position, and the number of terminals of its sensor for outputting signals indicating the load and the central position is desired to be small. Furthermore, this sensor is desired to be easily manufactured and to cover variously shaped objects.

Japanese Patent Publication No. 1308321 discloses a detection method for surface pressure data, which easily allows detection of the summation of surface pressures and its barycentric position by using an extremely simple device. The detection method for surface pressure data is characterized by including steps of: using a pressure detector composed of a sheet resistance material in a first layer consisting of a flexible material with high conductivity, a pressure-sensitive plate in a second layer whose conductance approximately linearly varies due to an effect of pressure, and a sheet resistance material in a third layer with high conductivity; separately dividing a circumference in pressure detector into two pairs of opposite sides facing each other; applying electric voltages +a and −a to electrodes installed in a pair of opposite sides facing each other in the sheet resistance material in the first layer and to electrodes installed in another pair of opposite sides facing each other in the sheet resistance in the third layer via resistances respectively; and calculating a summation W of the surface pressure acting on the pressure detector based on the electric voltages and electric voltages $V_A$ and $V_B$ or $V_C$ and $V_D$ of a pair of electrodes in a first or second sheet resistance material by the following equation:

$$W = k_0(2a - V_A - V_B) = k_0(2a + V_C + V_D)$$

($K_0$ is a constant).

Japanese Patent Publication No. 1875498 discloses a method of positioning on a surface of an object by using a surface pressure sensor which is able to directly detect a position of a working end of an apparatus on the surface of the object by using a simple means, is adaptable for errors of relative position and direction between a positioning device and the object, and does not require processing for dead areas. The method of positioning on a surface of an object by using surface pressure sensor is characterized by, when positioning a working end of a device on a surface of the target object, including steps of: applying a flexible surface pressure sensor for simultaneously detecting a contact point and a contact force on an object; moving a contact point on the surface of the object to the working end by a drive device where its driving is controlled by a control instruction of a controller; comparing a contact position outputted from the surface pressure sensor according to a contact of the working end with a target position outputted from a target contact position setter which sets the target position in a position comparator and comparing a contact force outputted from the surface pressure sensor according to the contact of the working end with a target contact force outputted from a target contact force setter which sets the target contact force in a contact force comparator; inputting the comparison outputs of the position comparator and the contact force comparator as inputs of the controller to perform a control of the drive device for adjusting the position and the contact force of the contact point; and performing positioning of the contact point on the target position on the surface of the object at the target contact force.

Japanese Patent Publication No. 1928006 discloses a slip sensor having a simple configuration for detecting an existence of slip. The slip sensor is characterized by composing, between a pair of conductive sheets formed of a flexible material with high conductivity, a detector by holding an elastic insulator including many holes which make the sheets directly and partially face each other and by connecting electrodes installed on a pair of opposite sides in one conductive sheet and on another pair of opposite sides in the other conductive sheet with a variation detection circuit for detecting slip between a detector and an object based on a temporal variation of the barycentric position via a barycentric position detection circuit for obtaining the barycentric position of an electric current density between both of the conductive sheets.

DISCLOSURE OF INVENTION

A problem relating to the present invention is to provide a 2D load distribution center position detection sensor and a 2D load distribution center position detection device which can be easily manufactured.

Another problem relating to the present invention is to provide a 2D load distribution center position detection sensor and a 2D load distribution center position detection device which detects a load applied to a free-form surface.

Further another problem relating to the present invention is to provide a 2D load distribution center position detection sensor and a 2D load distribution center position detection device which detects a load applied to a large size free-form surface.

Further another problem relating to the present invention is to provide a 2D load distribution center position detection sensor and a 2D load distribution center position detection device which detects a load applied to a free-form surface much more certainly.

A 2D load distribution center position detection sensor according to the present invention includes: a plurality of detection elements, wherein an electric resistance between a first electrode and a second electrode of each of the plurality of detection elements varies when a load is acted on; and a plurality of cables connecting adjoining detection elements among the plurality of detection elements. The cables further electrically connect a first electrode of a first detection element of the adjoining detection elements to a first electrode of a second detection element of the adjoining detection elements via a first resistor, and electrically connecting a second electrode of the first detection element to a second electrode of the second detection element via a second resistor.

Such a two dimensional load distribution center position detection sensor is approximately equivalent to the pressure detector disclosed in Japanese Patent Publication No. 1308321 or Japanese Patent Publication No. 1875498, when the first electrodes of the detection elements arranged at both ends in an x axis direction among a plurality of the detection elements are connected to two terminals, respectively, and also the second electrodes of the detection elements arranged at both ends in a y axis direction among a plurality of the detection elements are connected to two terminals, respectively. The 2D load distribution center position detection sensor according to the present invention does not need to include a sheet resistor which is uniform in composition and thickness of the material and can be easily manufactured than the 2D load distribution center position detection sensor including a sheet resistor.

The cables are deformable. Such a two dimensional load distribution center position detection sensor can be deformed to be various curved surfaces.

The plurality of detection elements are arranged in a lattice formation. Concretely, arbitrary four cables among the plurality of cables form sides of a quadrangle having four detection elements among the detection elements as vertexes. On this occasion, the 2D load distribution center position detection sensor can deform to be various curved surface and can cover surfaces of variously shaped objects because the internal angles of the quadrangle change.

The electric resistances of the detection elements are in approximately inversely proportional to the applied load. On this occasion, the 2D load distribution center position detection device to which the 2D load distribution center position detection sensor is applied can easily calculate the load acting on the 2D load distribution center position detection sensor.

The 2D load distribution center position detection device according to the present invention includes; a 2D load distribution center position detection sensor according to the present invention; and a controller. The 2D load distribution center position detection sensor includes; a first terminal electrically connected to a first electrode of a detection element among the plurality of detection elements and arranged in an end of a first direction; a second terminal electrically connected to a first electrode of a detection element among the plurality of detection elements and arranged in an end of a direction opposite to the first direction; a third terminal electrically connected to a second electrode of a detection element among the plurality of detection elements and arranged in an end of a second direction different from the first direction; and a forth terminal electrically connected to a second electrode of a detection element among the plurality of detection elements and arranged in an end of a direction opposite to the second direction. The controller applies electric voltages among the first terminal, the second terminal, the third terminal, and the fourth terminal so that an electric current passes the 2D load distribution center position detection sensor, and calculates a position of a load acting on the 2D load distribution center position detection sensor based on an electric current passing the first terminal, an electric current passing the second terminal, an electric current passing the third terminal, and an electric current passing the fourth terminal.

The control device calculates a load acting on the 2D load distribution center position detection sensor based on the current passing the first terminal, the current passing the second terminal, the current passing the third terminal and the current passing the forth terminal.

Each of the plurality of detection elements includes: a substrate on whose surface the first electrode and the second electrode are arranged; a pressure-sensitive material connected to the first electrode and the second electrode. The first electrode and the second electrode are sandwiched between the substrate and the pressure-sensitive material. This 2D load distribution center position detection sensor has an advantage that it can be easily manufactured.

The 2D load distribution center position detection sensor according to the present invention further includes an elastomer layer composed of an elastic material. The elastomer layer covers a layer formed of the plurality of the detection elements and the plurality of the cables. In this case, when a fine object which cannot contact to, between adjoining two detection elements among a plurality of the detection elements, both of the two detection elements contacts via the elastomer layer, the 2D load distribution center position detection sensor can detect the contact. As the result, the 2D load distribution center position detection sensor can detect the load certainly.

The 2D load distribution center position detection sensor and the 2D load distribution center position detection device according to the present invention can be manufactured more easily.

BRIEF DESCRIPTION OF DRAWINGS

FIG. 17 is a graph showing a distribution of a pressure applied to the 2D load distribution center position detection sensor; and FIG. 18 is a graph showing a distribution of a pressure applied to a sensor layer and showing a distribution of a pressure measured by the detection elements.

BEST MODE FOR CARRYING OUT THE INVENTION

Figure 1:
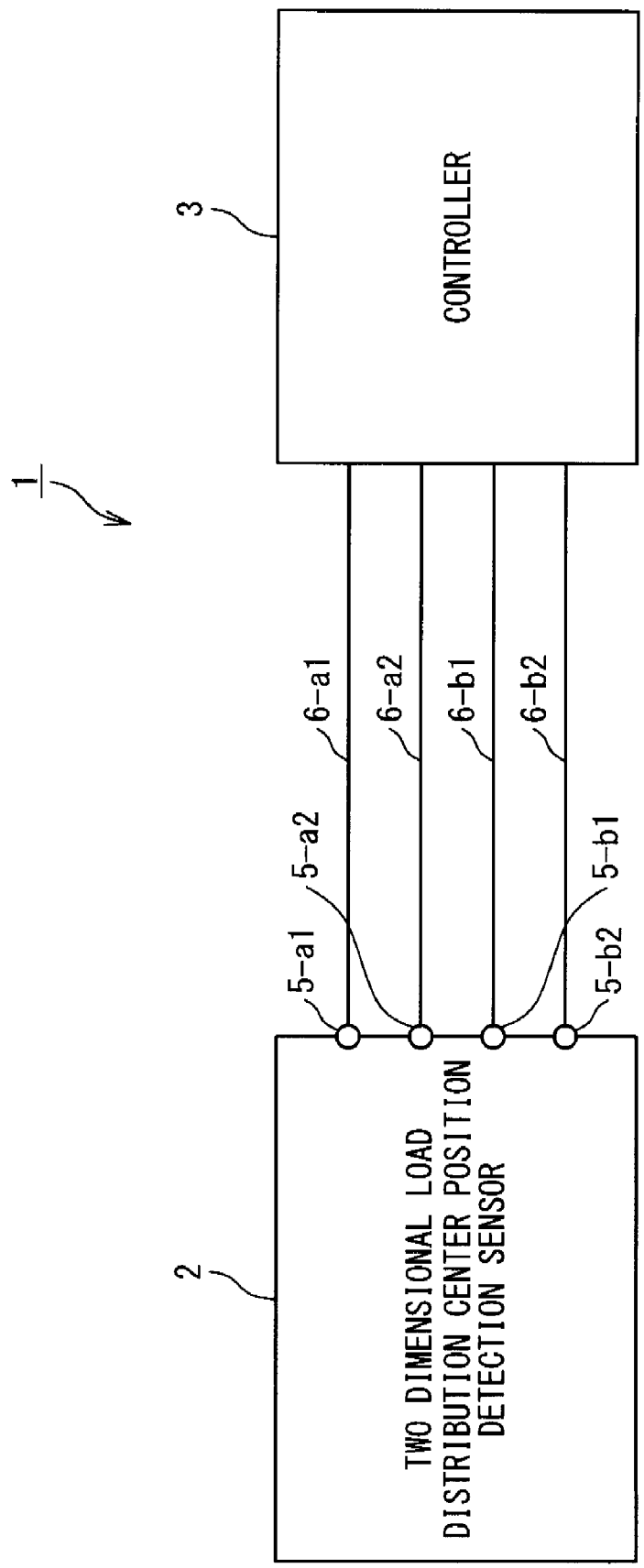
FIG. 1 is a block diagram showing an embodiment of a 2D load distribution center position detection device according to the present invention.

Referring to drawings, embodiments of the two dimensional load distribution center position detection device according to the present invention will be described. As shown in FIG. 1, the 2D load distribution center position detection device 1 includes a two dimensional load distribution center position detection sensor 2 and a controller 3. The 2D load distribution center position detection sensor 2 includes a terminal 5-$a1$, terminal 5-$a2$, terminal 5-$b1$, and terminal 5-$b2$. The terminal 5-$a1$ is connected to the controller 3 via an interconnection 6-$a1$. The terminal 5-$a2$ is connected to the controller 3 via an interconnection 6-$a2$. The terminal 5-$b1$ is connected to the controller 3 via an interconnection 6-$b1$. The terminal 5-$b2$ is connected to the controller 3 via an interconnection 6-$b2$.

Figure 2:
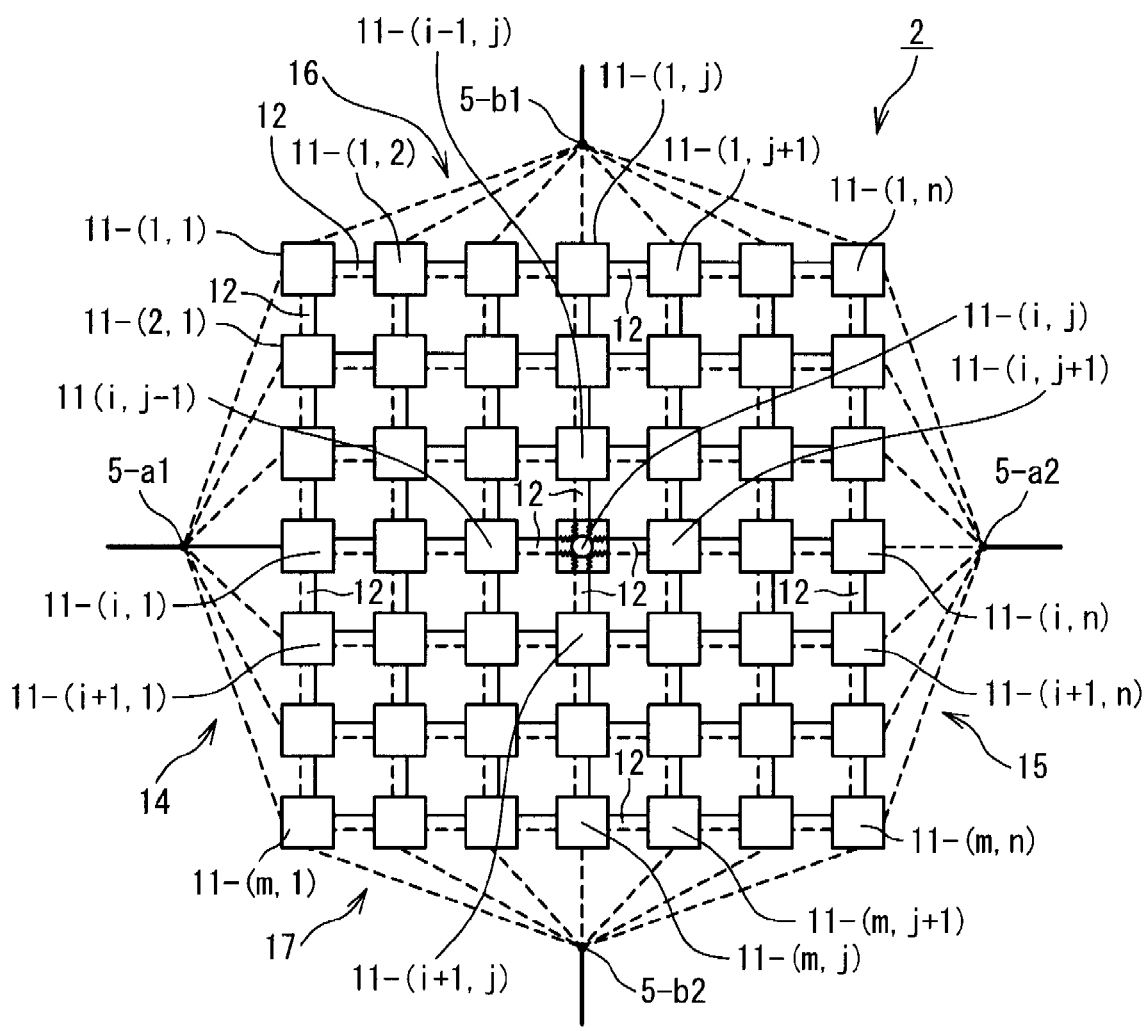
FIG. 2 is a block diagram showing an embodiment of the 2D load distribution center position detection sensor according to the present invention.

FIG. 2 shows the 2D load distribution center position detection sensor 2. The 2D load distribution center position detection sensor 2 includes a plurality of detection elements 11-(1, 1) to 11-(m, n) (m=2, 3, 4; n=2, 3, 4, ...), a plurality of cables 12, and interconnections 14 to 17. A plurality of the detection elements 11-(1, 1) to 11-(m, n) are arranged in a lattice formation. Concretely, a plurality of the detection elements 11-(1, 1) to 11-(m, n) are arranged on an intersection point formed by m number of parallel lines arranged on a plane and n number of parallel lines arranged on the plane, respectively. That is to say, the 2D load distribution center position detection sensor 2 includes (m×n) number of the detection elements 11-(1, 1) to 11-(m, n). The m number of parallel lines are perpendicular to the n number of parallel lines. Distances between any adjoining two parallel lines among the m number of parallel lines are equal to each other. Distances between any adjoining two parallel lines among the n number of parallel lines are equal to each other and equal to the distances between the adjoining two parallel lines among the m number of parallel lines.

The cables 12 include two conducting wires and an external coat, respectively. The two conducting wires are bundled with being insulated each other. The external coat covers the two conducting wires. The respective cables 12 are flexible. The cables 12 are equal with each other in their length and both ends of each of cables are connected to the adjoining two detection elements among a plurality of the detection elements 11-(1, 1) to 11-(m, n). Specifically, the cables 12 connect the detection elements 11-(i, j) (I=1, 2, 3, ..., m−1; j=1, 2, 3, ..., n−1) to the detection elements 11-(i+1, j), or connects the detection elements 11-(i, j) to the detection elements 11-(i, j+1). On this occasion, arbitrary four cables among the cables 12 form respective sides of a square having four detection elements among the detection elements 11-(1, 1) to 11-(m, n) as vertexes. The square can be deformed to be a diamond shape by deforming the cables 12. When the square formed by the cables 12 deforms to be the diamond shape, the 2D load distribution center position detection sensor 2 can deform to be various curved surfaces and can deform so as to closely fit to surfaces of variously shaped objects like a net for containing oranges.

The interconnections 14 to 17 are formed of a plurality of conductive wirings, respectively. The interconnection 14 connects the detection elements 11-(1, 1) to 11-(1, n) to the terminal 5-$a1$ and electrically connects one terminal among a plurality of terminals included in a plurality of the detection elements 11-(1, 1) to 11-(1, n) to the terminal 5-$a1$. The interconnection 15 connects the detection elements 11-(m, 1) to 11-(m, n) to the terminal 5-$a2$ and electrically connects one terminal among a plurality of terminals included in a plurality of the detection elements 11-(m, 1) to 11-(m, n) to the terminal 5-$a2$. The interconnection 16 connects the detection elements 11-(1, 1) to 11-(m, 1) to the terminal 5-$b1$ and electrically connects one terminal among a plurality of terminals included in a plurality of the detection elements 11-(1, 1) to 11-(m, 1) to the terminal 5-$b1$. The interconnection 17 connects the detection elements 11-(1, n) to 11-(m, n) to the terminal 5-$b2$ and electrically connects one terminal among a plurality of terminals included in a plurality of the detection elements 11-(1, n) to 11-(m, n) to the terminal 5-$b2$.

Figure 3:
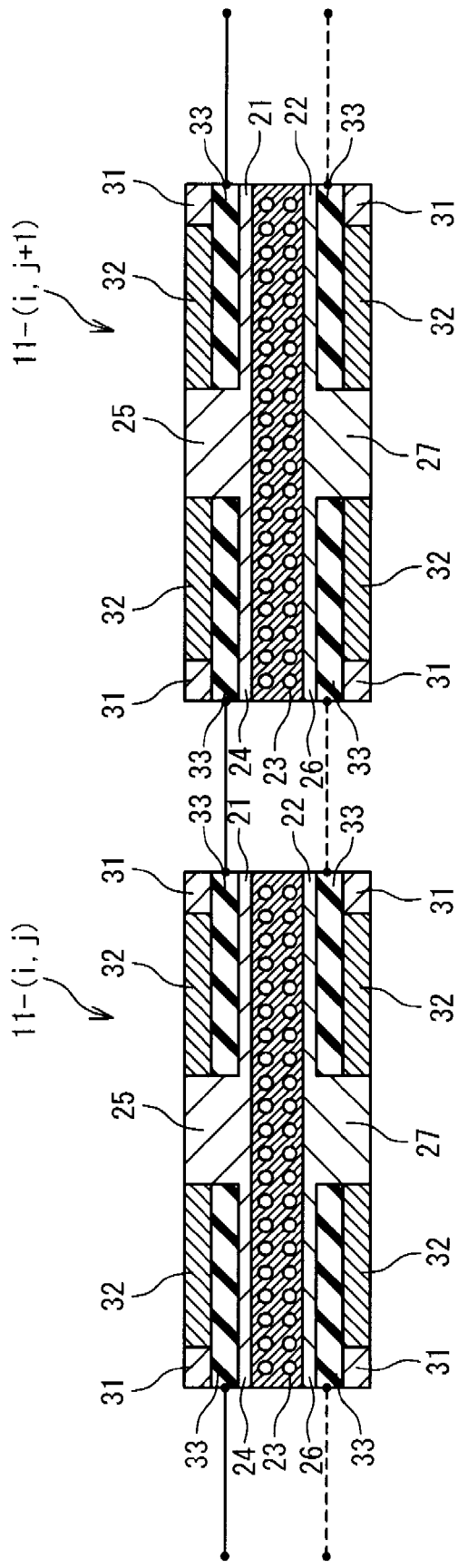
FIG. 3 is a plane view showing a detection element.

FIG. 3 shows the detection element 11-(i, j) (I=1, 2, 3, ..., m; j=1, 2, 3, ..., n). The detection element 11-(i, j) include an A layer electrode 21, a B layer electrode 22, and a pressure-sensitive material 23. The A layer electrode 21 is formed of conductive material and composed of a plate part 24 and a projection part 25. As the conductive material, metals are exemplified. The plate part 24 is formed to be a square plate shape. The projection part 25 is integrally connected to one surface of the plate part 24 and to the center of the square of the plate part 24. The B layer electrode 22 is formed of conductive material and composed of a plate part 26 and a projection part 27. The plate part 26 is formed to be a square plate shape. As the conductive material, metals are exemplified. The projection part 27 is integrally connected to one surface of the plate part 26 and to a center of the square of the plate part 26.

The pressure-sensitive material 23 is formed of an elastic body which is electrically conductive and shaped in a square plate. The pressure-sensitive material 23 changes its resistance by elastically deforming. One side of the pressure-sensitive material 23 contacts to a surface of the plate part 24 of the A layer electrode 21 on which the projection part 25 is not formed. The opposite side of the pressure-sensitive material 23 contacts to a surface of the plate part 26 of the B layer electrode 22 on which the projection part 27 is not formed. A resistance $r_p$ of the pressure-sensitive material 23 from the surface to which the A layer electrode 21 is connected to the surface to which the B layer electrode 22 is connected is represented, with using a pressure p applied in a thickness direction of the pressure-sensitive material 23 and a positive constant c, by the following expression:

$$r_p \propto p^{-c}$$

That is to say, when compressed by the A layer electrode 21 and the B layer electrode 22, the electric resistance of the pressure-sensitive material 23 is reduced.

The detection element 11-(i, j) further includes a plurality of connection terminals 31, a plurality of resistors 32, and insulators 33. A plurality of the connection terminals 31 are formed of conductive material, respectively, and are formed to be a stick shape. As the conductive material, metals are exemplified. A plurality of the resistors 32 are inserted between the connection terminal 31 and the projection part 27 of the A layer electrode 21, or inserted between the connection terminal 31 and the projection part 27 of the A layer electrode 21, respectively. The insulators 33 are formed of an insulator. The insulators 33 are connected to a surface on a side to which the projection part 25 of the plate part 24 of the A layer electrode 21 is connected and insulates between the A layer electrode 21 and the connection terminal 31. Or, the insulators 33 are connected to a surface on a side to which the projection part 27 of the plate part 26 of the B layer electrode 22 is connected and insulates between the B layer electrode 22 and the connection terminal 31.

Figure 4:
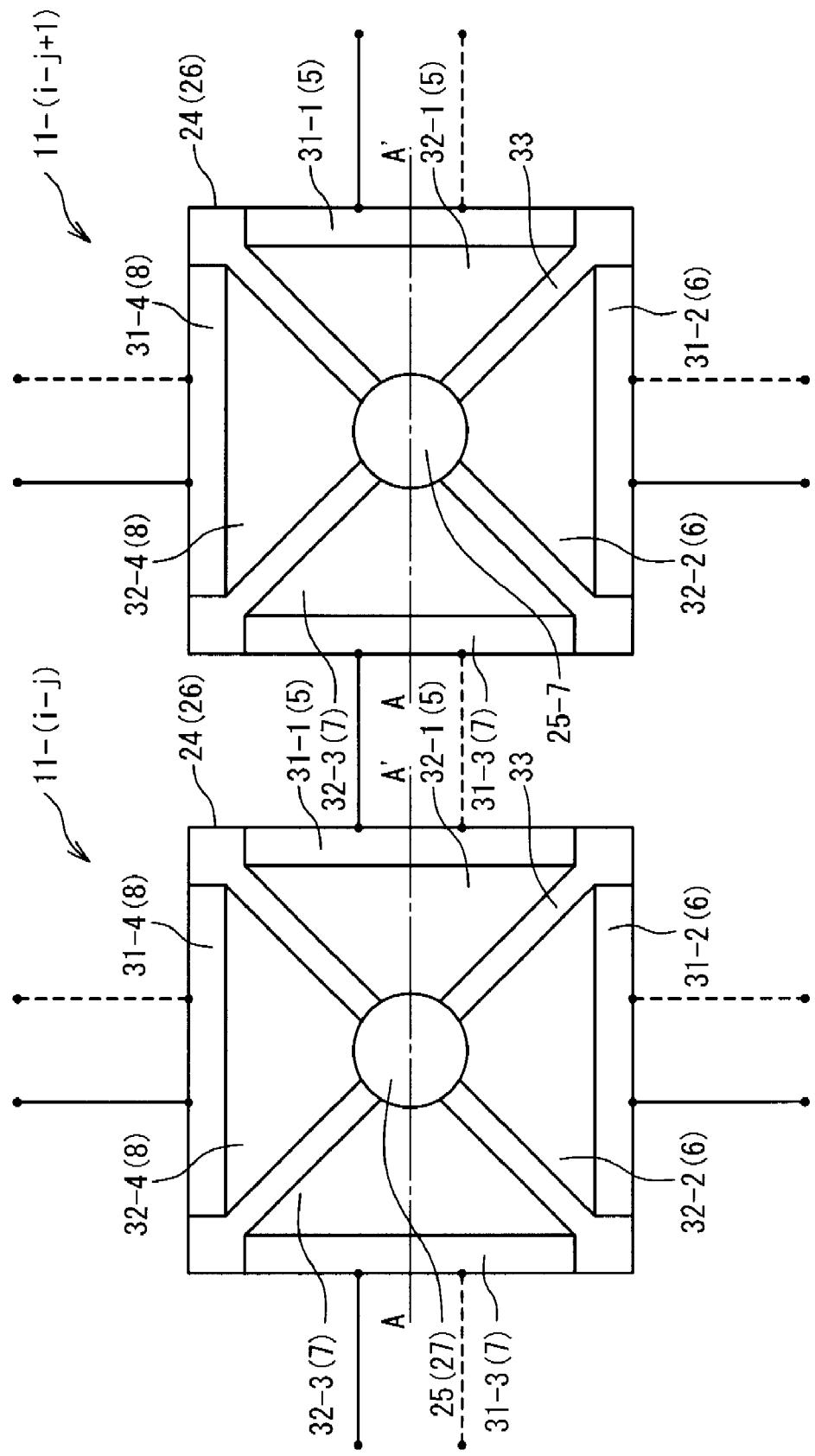
FIG. 4 is a cross sectional view showing the detection element.

As shown in FIG. 4, a plurality of the connection terminals 31 includes connection terminals 31-1 to 31-4. The connection terminals 31-1 to 31-4 are arranged along each of the sides of the square formed by the plate part 24 of the A layer electrode 21, respectively. A plurality of the resistors 32 includes resistors 32-1 to 32-4. The respective resistors 32-$k$ (k=1, 2, 3, 4) are inserted between the connection terminal 31-$k$ and the projection part 25 of the A layer electrode 21, and provides electric resistance between the connection terminal 31-$k$ and the projection part 25 of the A layer electrode 21.

A plurality of the connection terminals 31 further includes connection terminals 31-5 to 31-8. The connection terminals 31-5 to 31-8 are arranged along each of the sides of the square formed by the plate part 26 of the B layer electrode 22, respectively. A plurality of the resistors 32 further includes resistors 32-5 to 32-8. The respective resistors 32-$k'$ (k'=5, 6, 7, 8) are inserted between the connection terminal 31-$k'$ and the projection part 27 of the B layer electrode 22, and provides electric resistance between the connection terminal 31-$k'$ and the projection part 27 of the B layer electrode 22.

That is to say, the detection elements 11-(i, j) includes eight connection terminals 31. The resistors 32-1 to 32-8 are equal to each other in electric resistance, respectively. The electric resistance is efficiently higher than that of the two conducting wires included in the cables 12 and is efficiently higher than a variation amplitude of the electric resistance of the conducting wires of the cables 12 caused by the deformation of the cables 12.

In this detection element 11-(i, j), the electric resistances between the connection terminals 31-1 to 31-4 and the connection terminals 31-5 to 31-8 reduce when the projection part 25 of the A layer electrode 21 and the projection part 25 of the B layer electrode 22 are compressed. The electric resistance is a function of the force of the compression and is simply reduced in accordance with the force.

The connection terminal 31-1 of the detection element 11-(i, j) is electrically connected to the connection terminal 31-3 of the detection element 11-(i, j+1) via one conducting wire of the cables 12 connecting the detection element 11-(i, j) to the detection element 11-(i, j+1), and the connection terminal 31-5 of the detection element 11-(i, j) is electrically connected to the connection terminal 31-7 of the detection element 11-(i, j+1) via another one conducting wire of the cables 12.

The connection terminal 31-2 of the detection element 11-(i, j) is electrically connected to the connection terminal 31-4 of the detection element 11-(i+1, j) via one conducting wire of the cables 12 connecting the detection element 11-(i, j) to the detection element 11-(i+1, j), and the connection terminal 31-6 of the detection element 11-(i, j) is electrically connected to the connection terminal 31-8 of the detection element 11-(i+1, j) via another conducting wire of the cables 12.

The connection terminal 31-3 of the detection element 11-(i, j) is electrically connected to the connection terminal 31-1 of the detection element 11-(i, j−1) via one conducting wire of the cables 12 connecting the detection element 11-(i, j) to the detection element 11-(i, j−1), and the connection terminal 31-7 of the detection element 11-(i, j) is electrically connected to the connection terminal 31-5 of the detection element 11-(i, j−1) via another conducting wire of the cables 12.

The connection terminal 31-4 of the detection element 11-(i, j) is electrically connected to the connection terminal 31-2 of the detection element 11-(i−1, j) via one conducting wire of the cables 12 connecting the detection element 11-(i, j) to the detection element 11-(i−1, j), and the connection terminal 31-8 of the detection element 11-(i, j) is electrically connected to the connection terminal 31-6 of the detection element 11-(i−1, j) via another conducting wire of the cables 12.

The connection terminal 31-3 of the detection element 11-(i, 1), that is, the connection terminals 31-3 of the detection elements 11-(1, 1) to 11-(m, 1) are electrically connected to the terminal 5-$a1$ via the interconnection 14. The connection terminal 31-7 of the detection element 11-(i, 1) is an open end and is not connected to anywhere. The connection terminal 31-1 of the detection element 11-(i, n), that is, the connection terminals 31-1 of the detection elements 11-(1, n) to 11-(m, n) are electrically connected to the terminal 5-$a2$ via the interconnection 15. The connection terminal 31-5 of the detection element 11-(i, n) is an open end and is not connected to anywhere. The connection terminal 31-8 of the detection element 11-(1, j), that is, the connection terminals 31-8 of the detection elements 11-(1, 1) to 11-(1, n) are electrically connected to the terminal 5-$b1$ via the interconnection 16. The connection terminal 31-4 of the detection element 11-(1, j) is an open end and is not connected to anywhere. The connection terminal 31-6 of the detection element 11-(m, j), that is, the connection terminals 31-6 of the detection elements 11-(m, 1) to 11-(m, n) are electrically connected to the terminal 5-$b2$ via the interconnection 17. The connection terminal 31-2 of the detection element 11-(m, j) is an open end and is not connected to anywhere.

Figure 5:
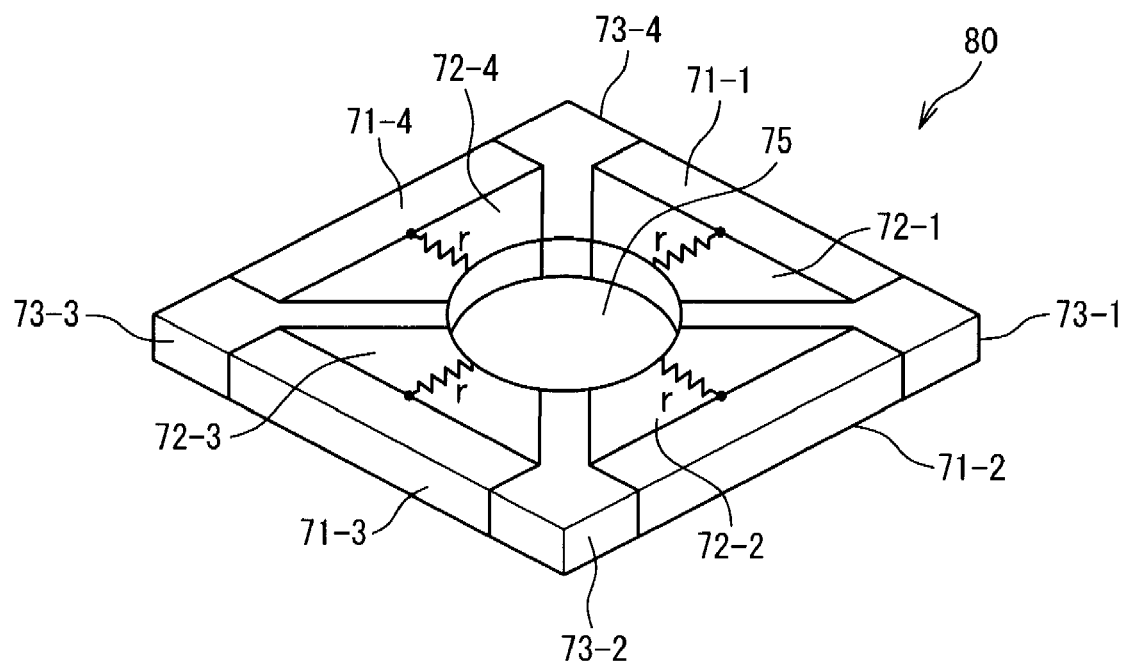
FIG. 5 is a perspective view showing one part of the detection element.

FIG. 5 shows one part of the detection element 11-(i, j). A part 80 is formed to be a square plate, and a circular hole 75 is formed at the center of the square. The part 80 includes terminals 71-1 to 71-4, resistors 72-1 to 72-4, and insulators 73-1 to 73-4. The terminals 71-1 to 71-4 are formed of metal, and are arranged along the four sides of the square, respectively. The resistor 72-1 is arranged between the terminal 71-1 and the hole 75. The resistor 72-2 is arranged between the terminal 71-2 and the hole 75. The resistor 72-3 is arranged between the terminal 71-3 and the hole 75. The resistor 72-4 is arranged between the terminal 71-4 and the hole 75. The insulators 73-1 to 73-4 are arranged along the intervals from four vertexes of the square to the hole 75. That is, the insulator 73-1 insulates the terminal 71-1 with the terminal 71-2 and the resistor 72-1 with the resistor 72-2. The insulator 73-2 insulates the terminal 71-2 with the terminal 71-3 and the resistor 72-2 with the resistor 72-3. The insulator 73-3 insulates the terminal 71-3 with the terminal 71-4 and the resistor 72-3 with the resistor 72-4. The insulator 73-4 insulates the terminal 71-4 with the terminal 71-1 and the resistor 72-4 with the resistor 72-1.

Specifically, the terminal 71-1 corresponds to the connection terminal 31-1 or the connection terminal 31-5. The terminal 71-2 corresponds to the connection terminal 31-2 or connection terminal 31-6. The terminal 71-3 corresponds to the connection terminal 31-3 or the connection terminal 31-7. The terminal 71-4 corresponds to the connection terminal 31-4 or the connection terminal 31-8. The resistor 72-1 corresponds to the resistor 32-1 or the resistor 32-5. The resistor 72-2 corresponds to the resistor 32-2 or the resistor 32-6. The resistor 72-3 corresponds to the resistor 32-3 or the resistor 32-7. The resistor 72-4 corresponds to the resistor 32-4 or the resistor 32-8. The insulators 73-1 to 73-4 correspond to the insulators 33.

Figure 6:
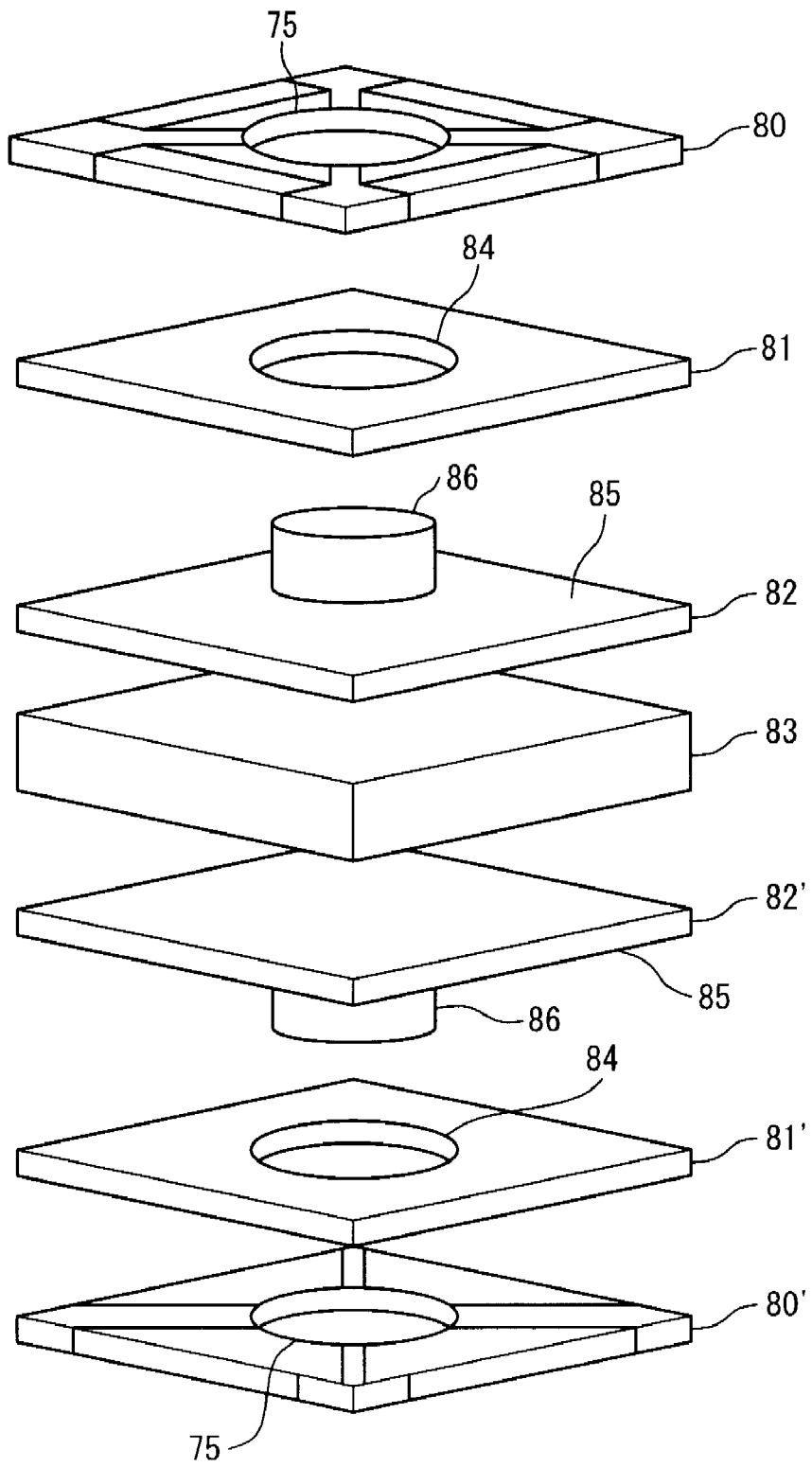
FIG. 6 is a perspective view showing a manufacturing method for the detection element.

FIG. 6 shows a manufacturing method of the detection element 11-(i, j). The detection element 11-(i, j) includes the part 80, a part 80', a part 81, a part 81', a part 82, a part 82', and a part 83. The part 80' is formed similarly to the part 80. The part 81 is formed of an insulator, and to be a square plate congruent with the square of the part 80, in which a hole 84 congruent with the hole 75 is formed at its center. The part 81' is formed similarly to the part 81. The part 82 is formed of metal, and to be a square plate congruent with the square of the part 80, in which a projection 86 is formed at the center of one surface 85. The projection 86 is formed to be a cylindrical shape. The bottom surface of the cylinder is congruent with a circle forming the hole 75. The height of the cylinder is equal to the sum of thicknesses of the part 80 and the part 81. The part 82' is formed similarly to the part 82. The part 83 is formed of a pressure-sensitive material which changes its resistance by elastically deforming, and formed to be a square plate congruent with the square of the part 80.

One surface of the part 83 is connected to the surface of the part 82 opposite to the surface 85 and is electrically connected to the part 82. The other surface of the part 83 is connected to the surface of the part 82' opposite to the surface 85 and is electrically connected to the part 82'. The part 81 is connected to the part 82 so that the projection 86 is arranged in the hole 84. The part 81' is connected to the part 82' so that the projection 86 is arranged in the hole 84. The part 80 is connected to the part 81 so that the projection 86 is arranged in the hole 75, the resistors 72-1 to 72-4 are electrically connected to the projection 86, and the terminals 71-1 to 71-4 are electrically insulated to the part 82 because of the part 81. The part 80' is connected to the part 81' so that the projection 86 is arranged in the hole 75, the resistors 72-1 to 72-4 are electrically connected to the projection 86, and the terminals 71-1 to 71-4 are electrically insulated to the part 82' because of the part 81'.

That is to say, the part 81 corresponds to the insulator 33. The part 81' corresponds to the insulator 33. The part 82 corresponds to the A layer electrode 21. The part 82' corresponds to the B layer electrode 22. The part 83 corresponds to the pressure-sensitive material 23.

Figure 7:
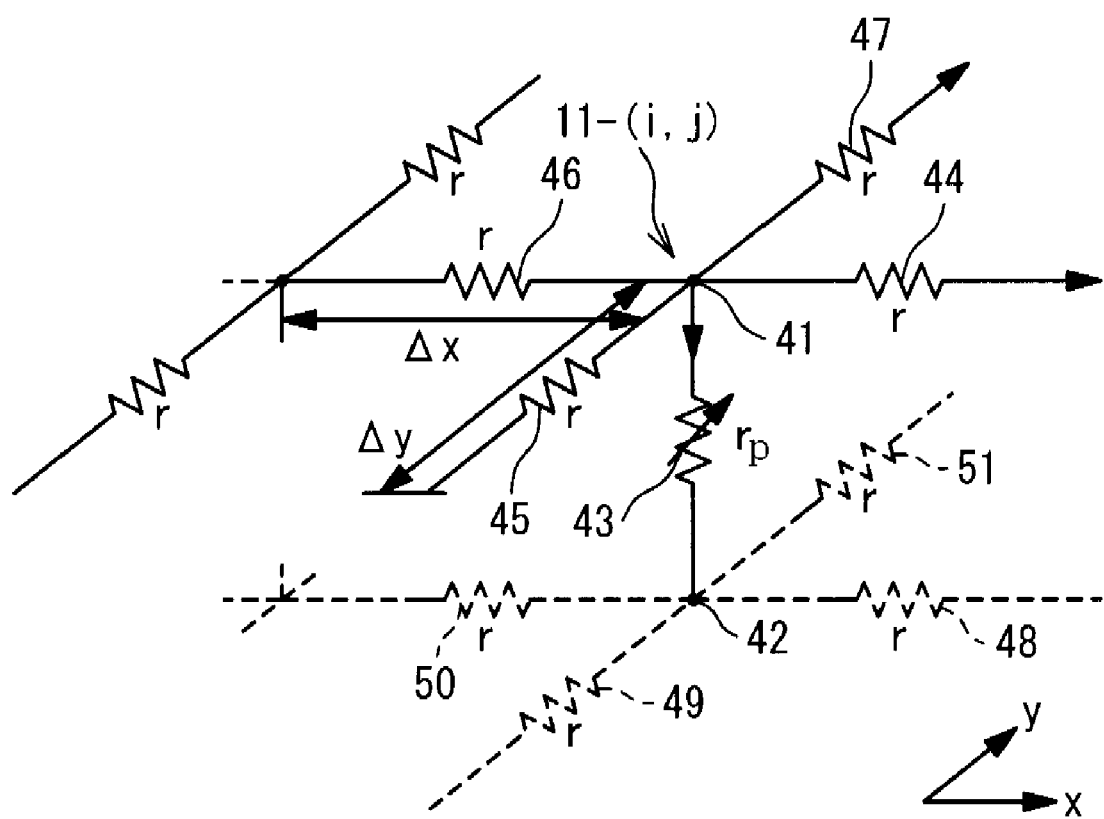
FIG. 7 is an electric circuit diagram showing a circuit element equivalent to the detection element.

FIG. 7 shows a circuit element equivalent to the detection element 11-(i, j). The circuit element includes nodes 41 and 42, a variable resistor 43, and resistors 44 to 51. The node 41 corresponds to the A layer electrode 21 of the detection element 11-(i, j). The node 42 corresponds to the B layer electrode 22 of the detection element 11-(i, j). The variable resistor 43 corresponds to the pressure-sensitive material 23 of the detection element 11-(i, j). The resistor 44 corresponds to a circuit element where the resistor 32-1 of the detection element 11-(i, j) is connected to the resistor 32-3 of the detection element 11-(i, j+1) in series via a conducting wire of the cables 12. The resistor 45 corresponds to a circuit element where the resistor 32-2 of the detection element 11-(i, j) is connected to the resistor 32-4 of the detection element 11-(i+1, j) in series via a conducting wire of the cables 12. The resistor 46 corresponds to a circuit element where the resistor 32-3 of the detection element 11-(i, j) is connected to the resistor 32-1 of the detection element 11-(i, j−1) in series via a conducting wire of the cables 12. The resistor 47 corresponds to a circuit element where the resistor 32-4 of the detection element 11-(i, j) is connected to the resistor 32-2 of the detection element 11-(i−1, j) in series via a conducting wire of the cables 12. The resistor 48 corresponds to a circuit element where the resistor 32-5 of the detection element 11-(i, j) is connected to the resistor 32-7 of the detection element 11-(i, j+1) in series via a conducting wire of the cables 12. The resistor 49 corresponds to a circuit element where the resistor 32-6 of the detection element 11-(i, j) is connected to the resistor 32-8 of the detection element 11-(i+1, j) in series via a conducting wire of the cables 12. The resistor 50 corresponds to a circuit element where the resistor 32-7 of the detection element 11-(i, j) is connected to the resistor 32-5 of the detection element 11-(i, j−1) in series via a conducting wire of the cables 12. The resistor 51 corresponds to a circuit element where the resistor 32-8 of the detection element 11-(i, j) is connected to the resistor 32-6 of the detection element 11-(i−1, j) in series via a conducting wire of the cables 12.

The variable resistor 43 is inserted between the node 41 and the node 42. The resistor 44 is inserted between the node 41 and the node 41 of the detection element 11-(i, j+1). The resistor 45 is inserted between the node 41 and the node 41 of the detection element 11-(i+1, j). The resistor 46 is inserted between the node 41 and the node 41 of the detection element 11-(i, j−1). The resistor 47 is inserted between the node 41 and the node 41 of the detection element 11-(i−1, j). The resistor 48 is inserted between the node 42 and the node 42 of the detection element 11-(i, j+1). The resistor 49 is inserted between the node 42 and the node 42 of the detection element 11-(i+1, j). The resistor 50 is inserted between the node 42 and the node 42 of the detection element 11-(i, j−1). The resistor 51 is inserted between the node 42 and the node 42 of the detection element 11-(i−1, j).

This 2D load distribution center position detection sensor 2 is approximately equivalent to the pressure detector disclosed in Japanese Patent Publication No. 1308321 or Japanese Patent Publication No. 1875498. These pressure detectors include a sheet-shaped resistor. In such a sheet-shaped resistor, uniformity of composition and thickness of the material are required, so that the larger the area of the resistor become, it becomes more difficult to manufacture the resistor. In the 2D load distribution center position detection sensor 2, such a sheet resistor is not required and can be easily manufactured than the pressure detector including the sheet resistor.

The above-mentioned pressure detector is formed to be a sheet shape and can cover a surface curving in one direction, however, is hard to cover other curved surfaces (for example, a part of a spherical surface). In the case of the 2D load distribution center position detection sensor 2, as the square formed by the cables 12 deforms to be a rhomboid shape, it is possible to cover surfaces of variously shaped objects and usability is high.

Figure 8:
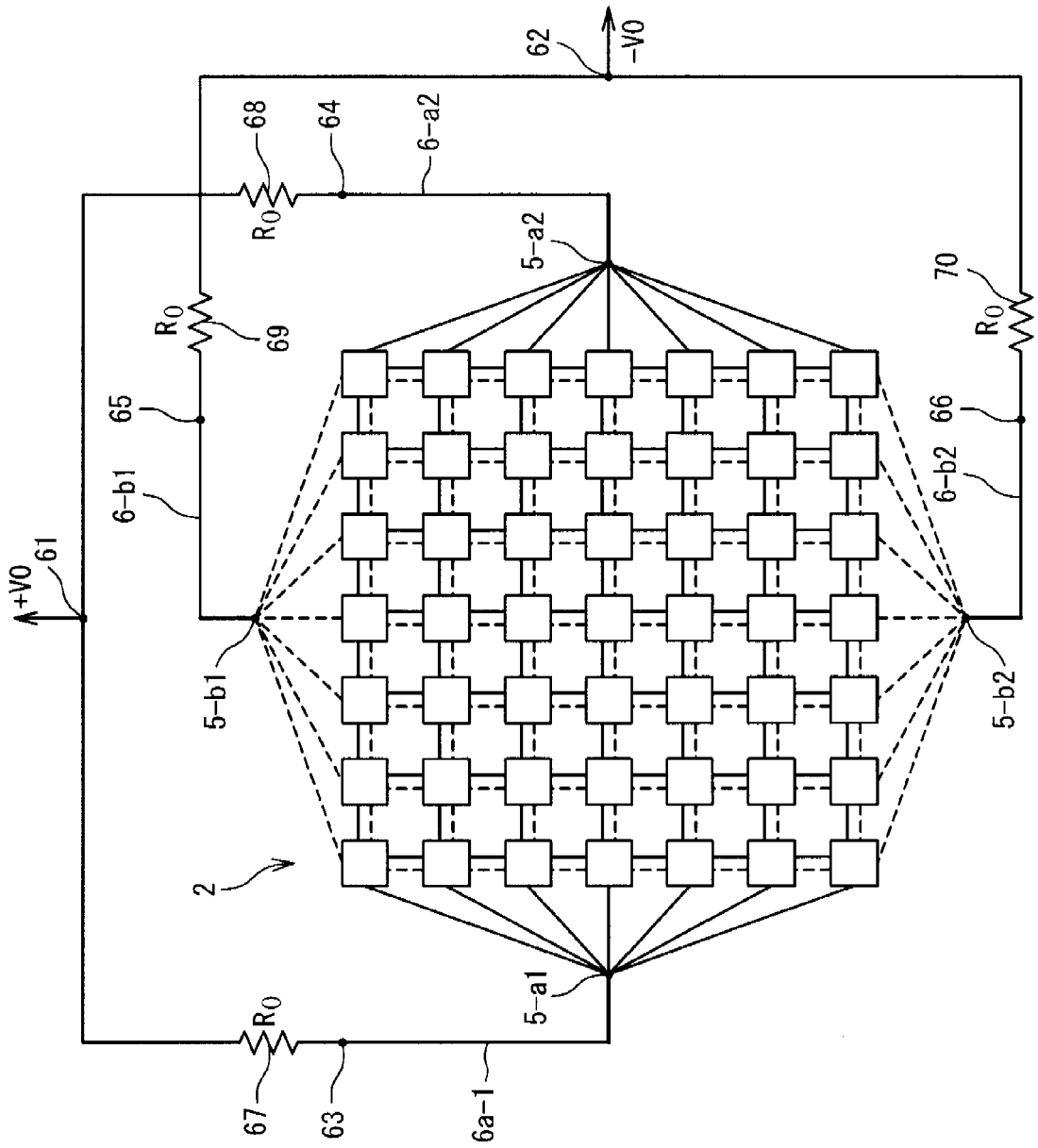
FIG. 8 is a circuit diagram showing a controller.

FIG. 8 shows the controller 3. The controller 3 includes a plurality of nodes 61 to 66 and a plurality of resistors 67 to 70. The node 63 is electrically connected to the terminal 5-$a1$ of the 2D load distribution center position detection sensor 2 via the interconnection 6-$a1$. The node 64 is electrically connected to the terminal 5-$a2$ of the 2D load distribution center position detection sensor 2 via the interconnection 6-$a2$. The node 65 is electrically connected to the terminal 5-$b1$ of the 2D load distribution center position detection sensor 2 via the interconnection 6-$b1$. The node 66 is electrically connected to the terminal 5-$b2$ of the 2D load distribution center position detection sensor 2 via the interconnection 6-$b2$. The resistor 67 is inserted between the node 61 and the node 63. The resistor 68 is inserted between the node 61 and the node 64. The resistor 69 is inserted between the node 62 and the node 65. The resistor 70 is inserted between the node 62 and the node 66. A plurality of the resistors 67 to 70 are equal to each other in the electric resistance.

The controller 3 further includes a power source device, a plurality of electrometers, a display, and a computer which are not shown in the drawings. The power source device applies a constant voltage between the node 61 and the node 62. The electrometers measure electric potentials of the nodes 61 to 66, respectively. The plurality of the electrometers can be replaced to a plurality of voltmeters. The voltmeters measure difference of the electric potential between the node 61 and the node 63, measure difference of the electric potential between the node 61 and the node 64, measure difference of the electric potential between the node 63 and the node 64, and measure difference of the electric potential between the node 65 and the node 66. The display is controlled by the computer and displays a screen produced by the computer.

The computer calculates a load acting on the 2D load distribution center position detection sensor 2 and the center position of the load based on the electric potentials of the nodes 61 to 66 generated when voltage is applied between the node 61 and the node 62. That is to say, the computer calculates the total electric current passing from the terminal 5-$a$1 or the terminal 5-$a$2 to the terminal 5-$b$1 or the terminal 5-$b$2 in the 2D load distribution center position detection sensor 2, a value corresponding to the first-order moment about the X axis of the current density distribution of the total electric current, and a value corresponding to the first-order moment about the Y axis of the current density distribution based on the electric potentials of the nodes 61 to 66.

The total current $I_{all}$ is represented with using the electric potential $+V_0$ of the node 61, the electric potential $-V_0$ of the node 62, the electric potential $V_{a1}$ of the node 63, the electric potential $V_{a2}$ of the node 64, the electric potential $V_{b1}$ of the node 65, the electric potential $V_{b2}$ of the node 66, and the electric resistances $R_0$ of the resistors 67 to 70 by the following equation:

$$I_{all} = \frac{2V_0 - V_{a1} - V_{a2}}{R_0} = \frac{2V_0 + V_{b1} + V_{b2}}{R_0} \quad \text{[Equation 1]}$$

The value $I_x$ corresponding to the first-order moment about the X axis of the current density distribution is represented with using an appropriate constant a, a constant r, and a constant $\lambda$ by the following equation:

$$I_x = a\left(\frac{\lambda}{R_0} + \frac{2}{r}\right)(V_{a1} - V_{a2}) \quad \text{[Equation 2]}$$

where the constant $\lambda$ is represented by the following equation:

$$\lambda = m \div n$$

The value $I_y$ corresponding to the first-order moment about the Y axis of the current density distribution is represented by the following equation:

$$I_y = a\left(\frac{1}{R_0} + \frac{2\lambda}{r}\right)(V_{b1} - V_{b2}) \quad \text{[Equation 3]}$$

The computer calculates the load based on the total current $I_{all}$, calculates the x coordinate of the center position by dividing the value $I_x$ by the total current $I_{all}$, and calculates the y coordinate value of the center position by dividing the value $I_y$ by the total current $I_{all}$.

The computer further calculates a slip based on changes of the load and the center position with respect to time. The slip indicates whether or not the slip has occurred between an object on which the 2D load distribution center position detection sensor 2 is covered and another object which contacts the object via the 2D load distribution center position detection sensor 2. Methods for calculating the slip are known and the calculation method described in Japanese Laid-Open Patent Application JP-A-Heisei, 6-58239 can be applied, for example.

The computer further generates a screen showing the load, the center position, and the slip, and displays the screen on a display.

The 2D load distribution center position detection device 1 is used by covering a surface of an object with the 2D load distribution center position detection sensor 2. As such a surface, a surface of a robot (the bottom of a robot's foot or the ball of a robot's finger) and a floor surface of an architectural structure are exemplified. In the 2D load distribution center position detection sensor 2, the electric potentials of the nodes 63 to 66 change when a load is applied on the 2D load distribution center position detection sensor 2 during a constant voltage is applied between the node 61 and the node 62. Concretely, when a load is applied on the 2D load distribution center position detection sensor 2, loads L (i, j) are applied on the respective detection elements 11-(i, j) of the 2D load distribution center position detection sensor 2. An electric current I (i, j) passing from the connection terminals 31-1 to 31-4 to the connection terminals 31-5 to 31-8 of the detection element 11-(i, j) is represented by the following equation:

$$I(i, j) = \frac{V_a(i, j) - V_b(i, j)}{r_p} = k_0 p^c = k_0 f_z^c(i, j) \quad \text{[Equation 4]}$$

In this equation, the load L (i, j) is indicated by $r_p$, $V_a$ (i, j) is the electric potential of the A layer electrode 21 of the detection element 11-(i, j), $V_b$ (i, j) is the electric potential of the B layer electrode 22 of the detection element 11-(i, j), $k_0$ is an appropriate constant, and $f_z^c$(i, j) is an appropriate function.

The total electric current $I_{all}$ is represented by a function of the summation of the loads L (i, j). The value $I_x$ and the value $I_y$ are represented with using a function $x_i$ of a parameter i and a function $y_j$ of a parameter j by the following equation:

$$I_x = \sum_{i=1}^{m}\sum_{j=1}^{n} x_i I(i, j), \quad I_y = \sum_{i=1}^{m}\sum_{j=1}^{n} y_j I(i, j) \quad \text{[Equation 5]}$$

Similar to the techniques described in Japanese Patent Publication No. 1308321 and Japanese Patent Publication No. 1875498, the controller 3 calculates a load acting on the 2D load distribution center position detection sensor 2 and the center position of the load. Concretely, the controller 3 measures electric potentials of the nodes 61 to 66. The controller 3 calculates the total electric current $I_{all}$ passing from the terminal 5-$a$1 or the terminal 5-$a$2 to the terminal 5-$b$1 or the terminal 5-$b$2 of the 2D load distribution center position detection sensor 2, a value corresponding to the first-order moment about the X axis of the current density distribution of the total electric current $I_{all}$, and a value corresponding to the first-order moment about the Y axis of the current density distribution based on the electric potentials of the nodes 61 to 66. The computer calculates the load based on the total electric current $I_{all}$, calculates the x coordinate value of its center position by dividing the value $I_x$ by the total electric current $I_{all}$, and calculates the y coordinate value of the center position by dividing the value $I_y$ by the total electric current $I_{all}$. The controller 3 further calculates a slip based on the change of the load and the center position with respect to time. The controller 3 further generates a screen showing the load, the center position, and the slip, and displays the screen on its display.

In addition, the power source device of the controller 3 can also apply a constant voltage between the node 61 and the node 62 so that a constant current can be supplied to the 2D load distribution center position detection sensor 2. On this occasion, the computer can calculate the load based on the voltage applied on the 2D load distribution center position detection sensor 2, calculate the x coordinate value of the center position due to the value $I_x$, and calculate the y coordinate value of the center position due to the value $I_y$.

That is to say, the 2D load distribution center position detection device 1 can calculate the load acting on the 2D load distribution center position detection sensor 2 and the center position of the load by using the 2D load distribution center position detection sensor 2 in the same manner to the pressure detector described in Japanese Patent Publication No. 1308321 and Japanese Patent Publication No. 1875498.

In another embodiment of a 2D load distribution center position detection sensor according to the present invention, the detection elements 11-(1, 1) to 11-(m, n) according to the aforementioned embodiment are replaced by detection elements of other type. Namely, the detection elements electrically connect the A layer electrode 21 to the B layer electrode 22 when a load is applied, disconnect the A layer electrode 21 from the B layer electrode 22 when a load is not applied. The 2D load distribution center position detection device including such a 2D load distribution center position detection sensor cannot calculate a load acting on the 2D load distribution center position detection sensor and the center position of the load, however, can calculate the center position of the area where a load is applied to the 2D load distribution center position detection sensor.

In further another embodiment of the 2D load distribution center position detection sensor according to the present invention, the cables 12 according to the aforementioned embodiment are replaced by cables of other type. Namely, the cables include two resistors and an external coat, respectively. The two resistors are bundled with being insulated each other. The external coat covers the two resistors. The electric resistances of the resistors are efficiently higher a variation amplitude of the electric resistance of the resistors caused by the deformation of the cables. The 2D load distribution center position detection device including such a 2D load distribution center position detection sensor can calculate a load acting on the 2D load distribution center position detection sensor and the center position of the load. According to this 2D load distribution center position detection sensor, the detection elements 11-(1, 1) to 11-(m, n) are not required to include the resistors 32 and can be easily manufactured.

In further another embodiment of the 2D load distribution center position detection sensor according to the present invention, the cables 12 according to aforementioned embodiments are replaced by cables of other type. The cables include cables having different lengths. A 2D load distribution center position detection device including such a 2D load distribution center position detection sensor can calculate a load acting on the 2D load distribution center position detection sensor and the center position of the load in the similar manner to the 2D load distribution center position detection device 1 according to aforementioned embodiments. According to this 2D load distribution center position detection sensor, there is an advantage that the resolution in measuring the load and its center position can be changed with respect to the location.

In further another embodiment of the 2D load distribution center position detection sensor according to the present invention, the cables 12 according to aforementioned embodiments are replaced by cables of other type. The cables are formed to be extensible. A 2D load distribution center position detection device including such a 2D load distribution center position detection sensor can calculate a load acting on the 2D load distribution center position detection sensor and the center position of the load in the similar manner to the 2D load distribution center position detection device 1 according to aforementioned embodiments. This 2D load distribution center position detection sensor has an advantage that the sensor can be more flexibly deformed to be various curved surfaces.

In another embodiment of a 2D load distribution center position detection sensor according to the present invention, the detection elements 11-(1, 1) to 11-(m, n) according to aforementioned embodiments are replaced by a plurality of detection elements of other type. The detection elements are arranged to be a shape other than the aforementioned squared lattice formation. As such shapes, a shape where the cables connecting the detection elements form sides of a triangle having three elements on its vertexes, a shape where the cables form sides of a hexagon having six elements on its vertexes, and a shape where the cables form sides of a rectangle having four elements on its vertexes are exemplified. A 2D load distribution center position detection device including such 2D load distribution center position detection sensors can calculate a load acting on the 2D load distribution center position detection sensor and the center position of the load in the similar manner to the 2D load distribution center position detection device 1 according to aforementioned embodiments. In this 2D load distribution center position detection sensor, the part having the above-mentioned diagrams formed by the cables can deform to be various curved surfaces in a similar manner to the 2D load distribution center position detection sensor 2 of the aforementioned embodiments having squared lattice diagram when the diagram is formed by forms other than triangle. When all of the cables form sides of triangles, the 2D load distribution center position detection sensor cannot deform to be various curved surfaces. Even in this case, however, there is an advantage that it can be easily manufactured compared to the pressure detector including a sheet-shaped resistor.

Figure 9:
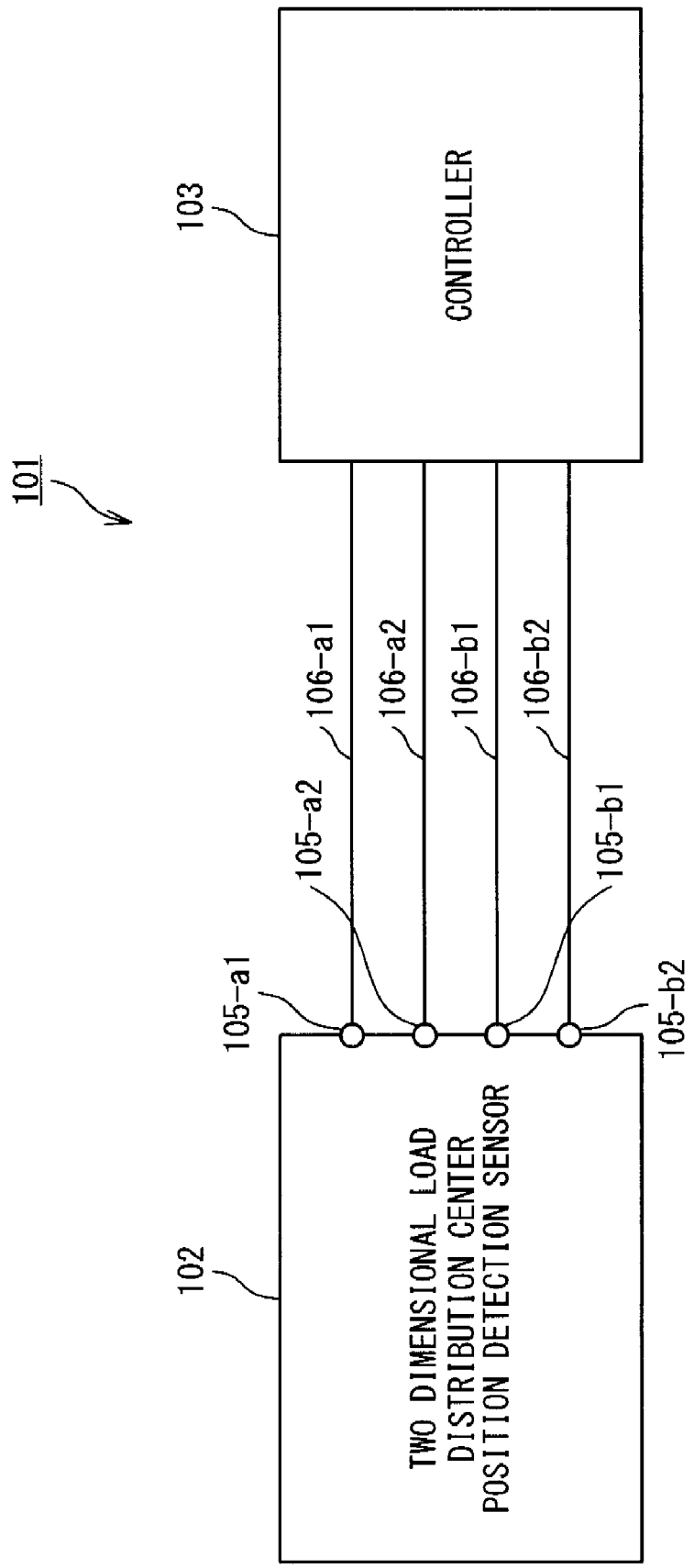
FIG. 9 is a block diagram showing another embodiment of a 2D load distribution center position detection device according to the present invention.

FIG. 9 shows further another embodiment of a 2D load distribution center position detection device 1 according to the present invention. The 2D load distribution center position detection device 101 includes a 2D load distribution center position detection sensor 102 and a controller 103. The 2D load distribution center position detection sensor 102 includes a terminal 105-$a1$, a terminal 105-$a2$, a terminal 105-$b1$, and a terminal 105-$b2$. The terminal 105-$a1$ is connected to the controller 103 via an interconnection 106-$a1$. The terminal 105-$a2$ is connected to the controller 103 via an interconnection 106-$a2$. The terminal 105-$b1$ is connected to the controller 103 via an interconnection 106-$b1$. The terminal 105-$b2$ is connected to the controller 103 via an interconnection 106-$b2$.

Figure 10:
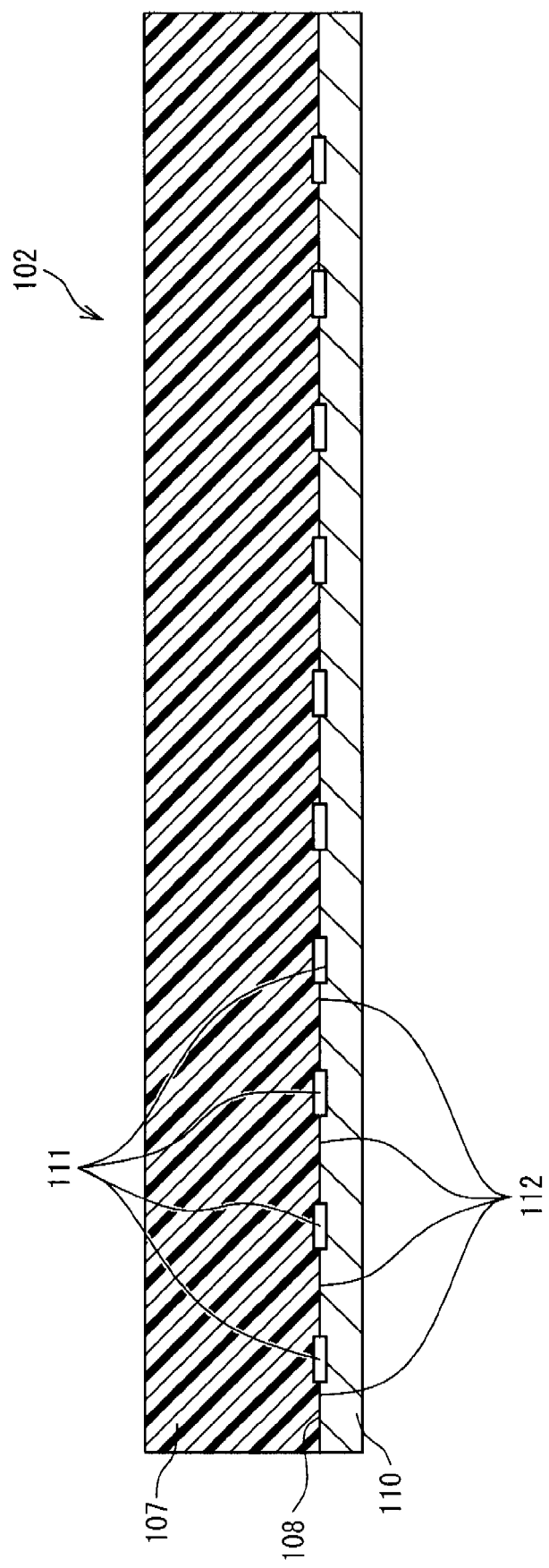
FIG. 10 is a cross sectional view showing a 2D load distribution center position detection sensor.

FIG. 10 shows the 2D load distribution center position detection sensor 102. The 2D load distribution center position detection sensor 102 is used with covering a surface of an object 110. The 2D load distribution center position detection sensor 102 is formed of an elastomer layer 107 and a sensor layer 108. The elastomer layer 107 is formed of a sheet made of an elastic body. As the elastic body, a rubber and a vinyl are exemplified. The sensor layer 108 includes a plurality of detection elements 111 and a plurality of cables 112. The sensor layer 108 is arranged between the object 110 and the elastomer layer 107.

Figure 11:
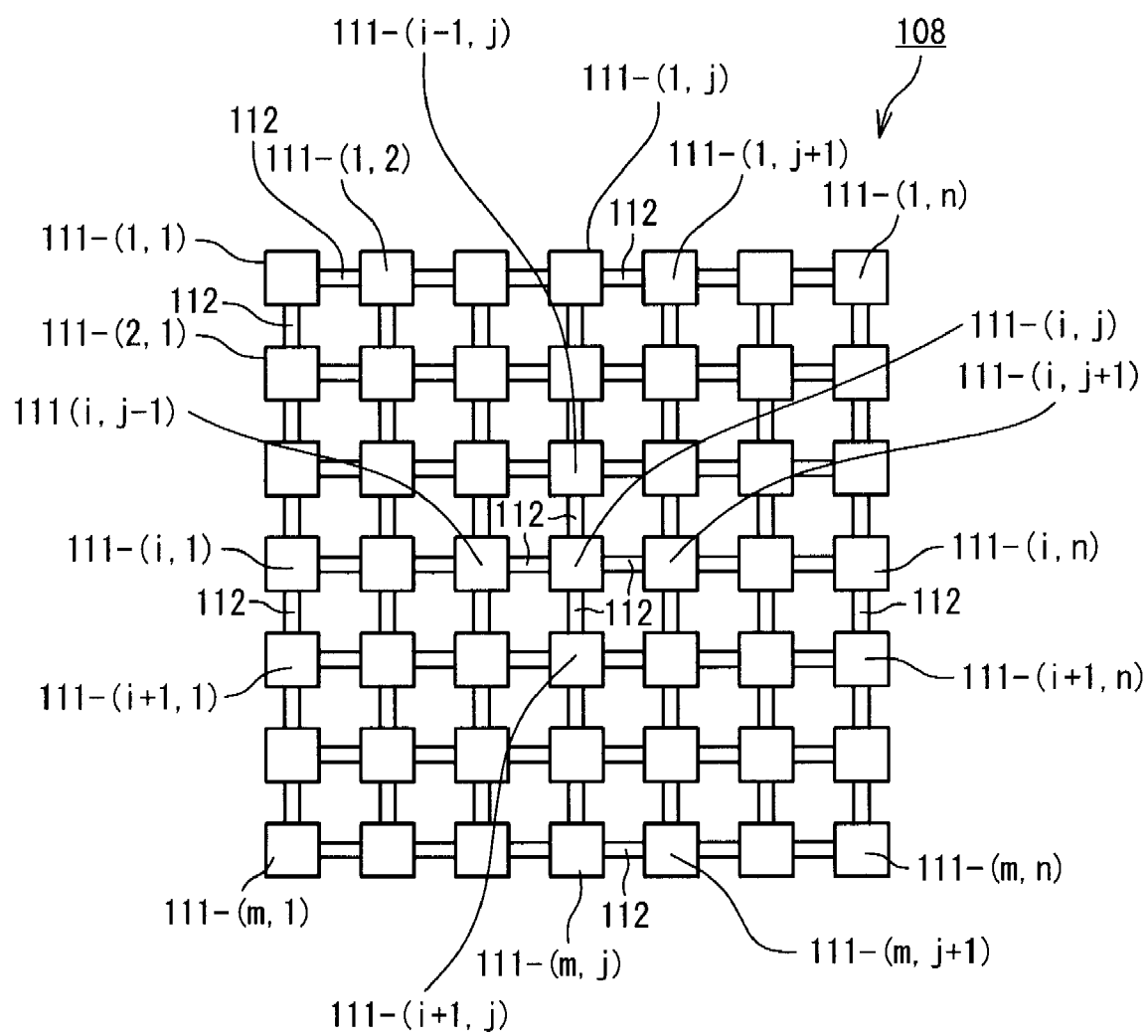
FIG. 11 is a plane view showing a sensor layer.

FIG. 11 shows the sensor layer 108. The detection elements 111 are formed of a plurality of detection elements 111-(1, 1) to 111-(m, n) (m=2, 3, 4, . . . ; n=2, 3, 4, . . . ). A plurality of the detection elements 111-(1, 1) to 111-(m, n) are arranged in a lattice formation. Specifically, a plurality of the detection elements 111-(1, 1) to 111-(m, n) is arranged on intersection points formed by m number of parallel lines arranged on a plane and n number of parallel lines arranged on the plane, respectively. That is to say, the 2D load distribution center position detection sensor 102 includes (m×n) number of the detection elements 111-(1, 1) to 111-(m, n) The m number of parallel lines are perpendicular to the n number of parallel lines. Distances between any adjoining two parallel lines among the m number of parallel lines are equal to each other. Distances between any adjoining two parallel lines among the n number of parallel lines are equal to each other and equal to the distances between adjoining two parallel lines among the m number of parallel lines.

The cables 112 include two conducting wires and an external coat, respectively. The two conducting wires are bundled with being insulated each other. The external coat is formed of an insulating material, covers the two conducting wires, and electrically insulates the two conducting wires each other. The respective cables 112 are flexible and can be deformed. The cables 112 are equal with each other in their length and both ends of them are connected to the adjoining two detection elements among a plurality of the detection elements 111-(1, 1) to 111-(m, n). Specifically, the cables 112 connect the detection element 111-(i, j) (i=1, 2, 3, . . . , m; j=1, 2, 3, . . . , n) to the detection element 111-(i+1, j), or connects the detection element 111-(i, j) to the detection element 111-(i, j+1). On this occasion, arbitrary four cables among the cables 112 form sides of a square having four detection elements among the detection elements 111-(1, 1) to 111-(m, n) (for example, the detection element 111-(i, j), the detection element 111-(i, j+1), the detection element 111-(i+1, j), the detection element 111-(i+1, j+1)) as vertexes. The square can deform to be a quadrangle other than the square shape when the cables 112 deform, and can further deform to be a solid where the four vertexes are arranged on vertexes of a tetrahedral lattice. When the squares formed by the cables 112 deforms to be quadrangles or tetrahedral solids, the 2D load distribution center position detection sensor 102 can deform to be various curved surfaces and can deform so as to closely fit to surfaces of variously shaped objects like a net for containing oranges.

Figure 12:
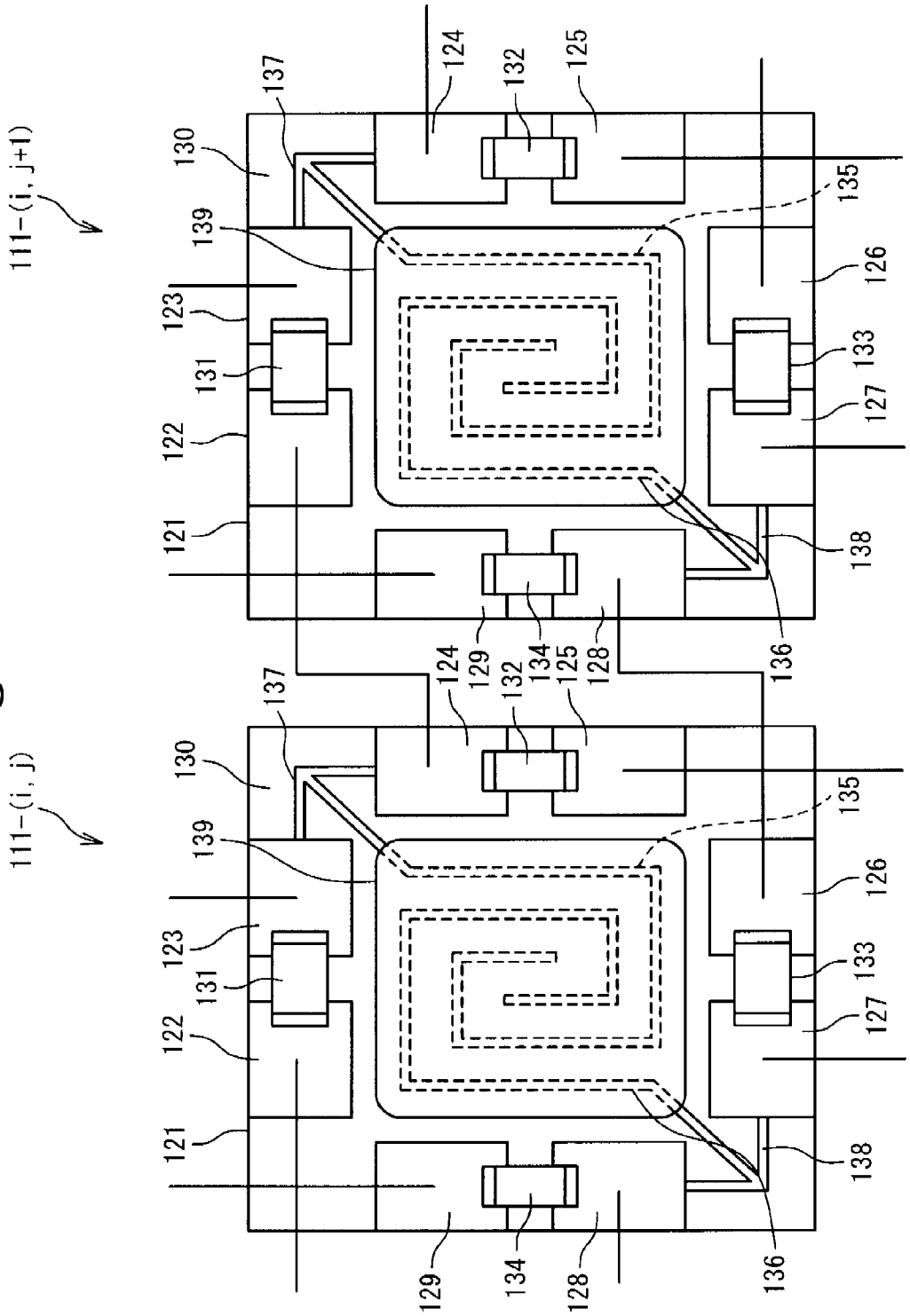
FIG. 12 is a plane view showing a detection element.

FIG. 12 shows the detection element 111-(i, j). The detection element 111-(i, j) includes a substrate 121, a plurality of terminals 122 to 129, a plurality of resistors 131 to 134, an A layer electrode 135, a B layer electrode 136, interconnections 137 to 138, and a pressure-sensitive material 139. The substrate 121 is formed of an insulating material and formed to be a square plate. A plurality of terminals 122 to 129 are formed of metal printed on a surface of the substrate 121 and is arranged on a fringe of the substrate 121, respectively. A plurality of resistors 131 to 134 includes two terminals respectively, and resistances of the resistors 131 to 134 are equal to each other. The resistor 131 is electrically connected to the terminal 122 at one end and is electrically connected to the terminal 123 at the other end. The resistor 132 is electrically connected to the terminal 124 at one end and is electrically connected to the terminal 125 at the other end. The resistor 133 is electrically connected to the terminal 126 at one end and is electrically connected to the terminal 127 at the other end. The resistor 134 is electrically connected to the terminal 128 at one end and is electrically connected to the terminal 129 at the other end. The A layer electrode 135 is formed of metal printed on a surface of the substrate 121 and is arranged at the center of the substrate 121. The B layer electrode 136 is formed of metal printed on a surface of the substrate 121 and is arranged at the center of the substrate 121. The interconnection 137 is formed of metal printed on a surface of the substrate 121, electrically connects the terminal 123 to the A layer electrode 135, and electrically connects the terminal 124 to the A layer electrode 135. The interconnection 138 is formed of metal printed on a surface of the substrate 121, electrically connects the terminal 127 to the B layer electrode 136, and electrically connects the terminal 128 to the B layer electrode 136.

Figure 13:
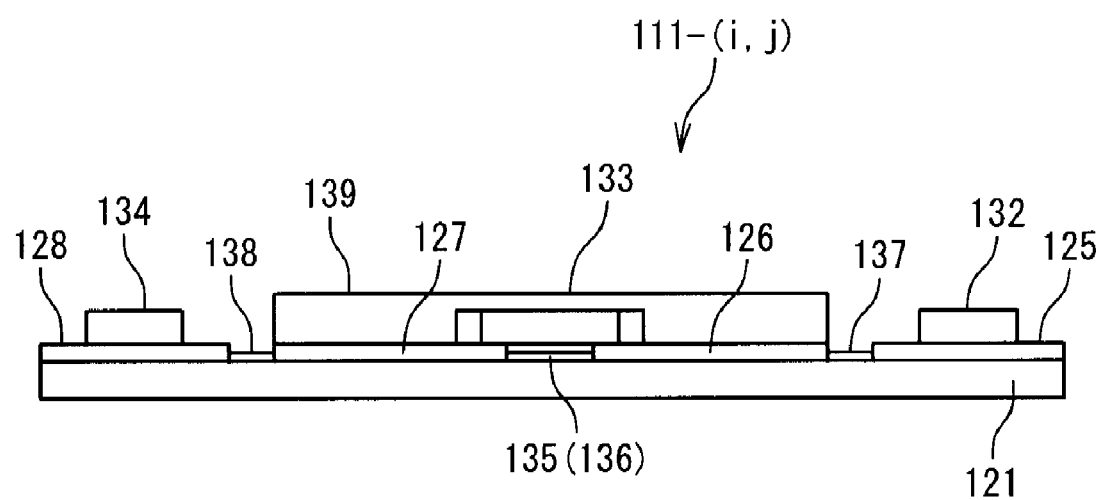
FIG. 13 is an elevation view showing the detection element.

The pressure-sensitive material 139 is formed of an elastic body which changes its resistance by being elastically deformed and is shaped in a square plate. As shown in FIG. 13, the pressure-sensitive material 139 is arranged at the center of the substrate 121 and is electrically connected to the A layer electrode 135 and the B layer electrode 136. The resistance $r_p$ from the A layer electrode 135 to the B layer electrode 136 of the pressure-sensitive material 139 is represented, with using a pressure p applied in a thickness direction of the pressure-sensitive material 39 and an appropriate positive constant c, by the following expression:

$$r_p \propto p^{-c}$$

That is to say, when compressed in the thickness direction, the electric resistance of the pressure-sensitive material 39 is reduced.

The terminal 122 is connected to the terminal 124 of the detection element 111-(i, j−1) by the cable 112. The terminal 123 is connected to the terminal 125 of the detection element 111-(i−1, j) by the cable 112. The terminal 124 is connected to the terminal 122 of the detection element 111-(i, j+1) by the cable 112. The terminal 125 is connected to the terminal 123 of the detection element 111-(i+1, j) by the cable 112. The terminal 126 is connected to the terminal 128 of the detection element 111-(i, j+1) by the cable 112. The terminal 127 is connected to the terminal 129 of the detection element 111-(i+1, j) by the cable 112. The terminal 128 is connected to the terminal 126 of the detection element 111-(i, j−1) by the cable 112. The terminal 129 is connected to the terminal 127 of the detection element 111-(i−1, j) by the cable 112.

Figure 14:
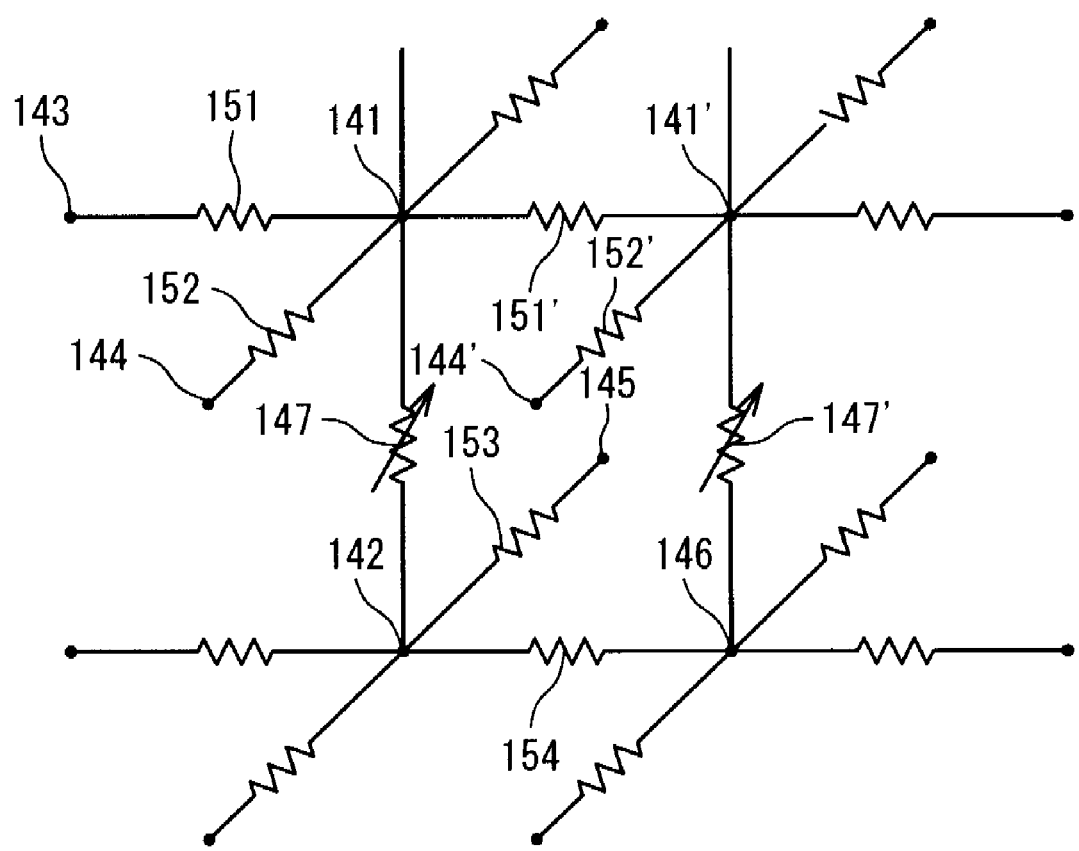
FIG. 14 is an electric circuit diagram showing a circuit element equivalent to the detection element.

FIG. 14 shows a circuit element equivalent to the detection element 111-(i, j). The circuit element includes nodes 141 to 146, a variable resistor 147, and resistors 151 to 154. The variable resistor 147 is inserted between the node 141 and the node 142. The resistor 151 is inserted between the node 141 and the node 143. The resistor 152 is inserted between the node 141 and the node 144. The resistor 153 is inserted between the node 142 and the node 145. The resistor 154 is inserted between the node 142 and the node 146.

The node 141 corresponds to the terminal 123 and the terminal 124 of the detection element 111-(i, j). The node 142 corresponds to the terminal 127 and the terminal 128 of the detection element 111-(i, j). The node 143 corresponds to the terminal 122 of the detection element 111-(i, j). The node 144 corresponds to the terminal 125 of the detection element 111-(i, j). The node 145 corresponds to the terminal 129 of the detection element 111-(i, j). The node 146 corresponds to the terminal 126 of the detection element 111-(i, j). The variable resistor 147 corresponds to the A layer electrode 135, the B layer electrode 136, and the pressure-sensitive material 139 of the detection element 111-(i, j). The resistor 151 corresponds to the resistor 131 of the detection element 111-(i, j).

The resistor 152 corresponds to the resistor 132 of the detection element 111-(i, j). The resistor 153 corresponds to the resistor 134 of the detection element 111-(i, j). The resistor 154 corresponds to the resistor 133 of the detection element 111-(i, j).

On this occasion, the node 141 further corresponds to the terminal 125 of the detection element 111-(i−1, j) and also corresponds to the terminal 122 of the detection element 111-(i, j+1). The node 142 corresponds to the terminal 126 of the detection element 111-(i, j−1) and also corresponds to the terminal 129 of the detection element 111-(i+1, j). The node 143 corresponds to the terminal 124 of the detection element 111-(i, j−1). The node 144 corresponds to the terminal 123 of the detection element 111-(i+1, j). The node 145 corresponds to the terminal 127 of the detection element 111-(i−1, j). The node 146 corresponds to the terminal 128 of the detection element 111-(i, j+1).

This 2D load distribution center position detection sensor 102 is approximately equivalent to the pressure detector disclosed in Japanese Patent Publication No. 1308321 or Japanese Patent Publication No. 1875498. Those pressure detectors include a sheet resistor. The sheet resistor need to be uniform in composition and thickness of the material, and the larger an area of the resistor becomes, it becomes more difficult to manufacture the resistor. The 2D load distribution center position detection sensor 102 does not need to include the sheet resistor and can be easily manufactured than the pressure detector including the sheet resistor.

Figure 15:
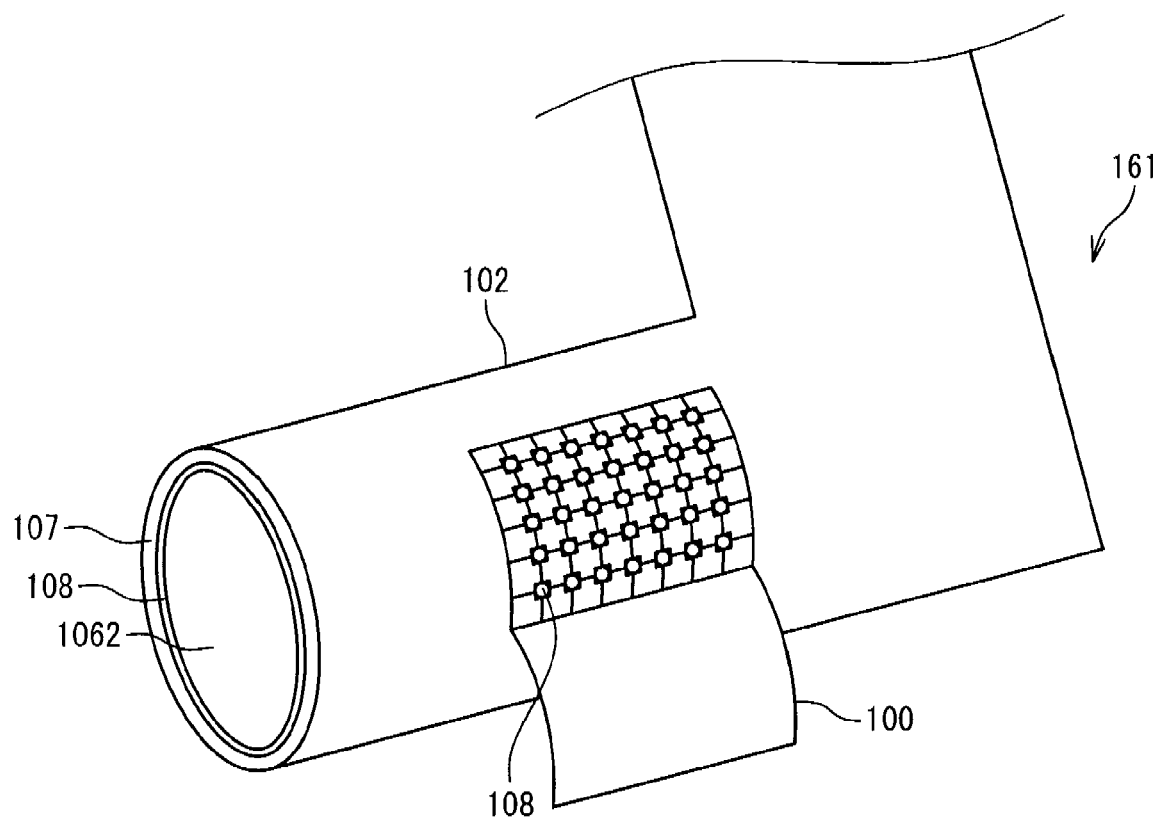
FIG. 15 is a perspective view showing a use state of the 2D load distribution center position detection sensor.

The pressure detector is formed to be a sheet shape and can cover a curved surface curving in one direction, however, is hard to cover other curved surfaces (for example, a part of a spherical surface). In the case of the 2D load distribution center position detection sensor 102, as the square formed by the cables 112 deforms to be a quadrangle other than the square or a tetrahedral solid shape, and the elastomer layer 107 elastically deforms, it is possible to cover surfaces of variously shaped objects and usability is high. As shown in FIG. 15, the 2D load distribution center position detection sensor 102 can cover a robot's elbow for example.

Figure 16:
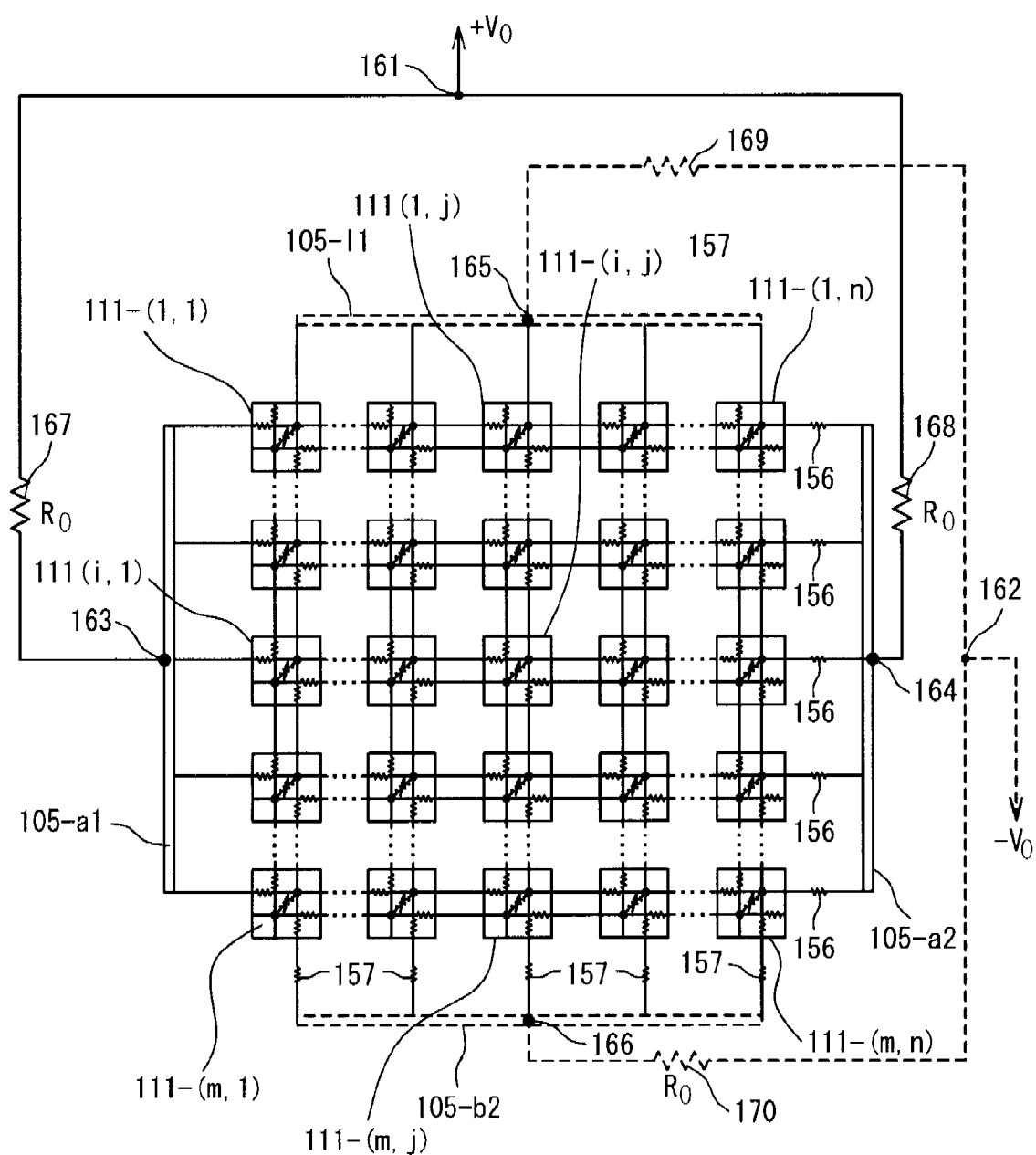
FIG. 16 is a circuit diagram showing a circuit equivalent to the 2D load distribution center position detection sensor and a circuit included in a control device.

In the 2D load distribution center position detection sensor 102 as shown in FIG. 16, terminals 122 of the detection elements 111-(1,1) to 111-(m, 1) are electrically connected to the terminal 105-a1, respectively. The terminals 124 of the detection elements 111-(1, n) to 111-(m, n) are electrically connected to the terminal 105-a2 via the resistors 156, respectively. The terminals 129 of the detection elements 111-(1, 1) to 111-(1, n) are electrically connected to the terminal 105-b1, respectively. The terminals 127 of the detection elements 111-(m, 1) to 111-(m, n) are electrically connected to the terminal 105-b2 via the resistors 157, respectively. Resistance of each resistors 157 is equal to the resistance of the resistor 156 and also equal to the resistances of the resistors 131 to 134.

As shown in FIG. 16, the controller 103 includes a plurality of nodes 161 to 166 and a plurality of resistors 167 to 170. The node 163 is electrically connected to the terminal 105-a1 of the 2D load distribution center position detection sensor 102 via the interconnection 106-a1. The node 164 is electrically connected to the terminal 105-a2 of the 2D load distribution center position detection sensor 102 via the interconnection 106-a2. The node 165 is electrically connected to the terminal 105-b1 of the 2D load distribution center position detection sensor 102 via the interconnection 106-b1. The node 166 is electrically connected to the terminal 105-b2 of the 2D load distribution center position detection sensor 102 via the interconnection 106-b2. The resistor 167 is inserted between the node 161 and the node 163. The resistor 168 is inserted between the node 161 and the node 164. The resistor 169 is inserted between the node 162 and the node 165. The resistor 170 is inserted between the node 162 and the node 166. A plurality of the resistors 167 to 170 is equal to each other in the electric resistance.

The controller 103 further includes a power source device, a plurality of electrometers, a display, and a computer which are not shown in the drawings. The power source device applies a constant voltage between the node 161 and the node 162. The electrometers measure electric potentials of the nodes 161 to 166, respectively. The plurality of the electrometers can be replaced to a plurality of voltmeters. The voltmeters measure difference of the electric potential between the node 161 and the node 163, measure difference of the electric potential between the node 161 and the node 164, measure difference of the electric potential between the node 163 and the node 164, and measure difference of the electric potential between the node 165 and the node 166. The display is controlled by the computer and displays a screen generated by the computer.

The computer calculates a load acting on the 2D load distribution center position detection sensor 102 and the center position of the load based on the electric potentials of the nodes 161 to 166 generated when voltage is applied between the node 161 and the node 162. That is to say, the computer calculates the total electric current passing from the terminal 105-a1 or the terminal 105-a2 to the terminal 105-b1 or the terminal 105-b2 in the 2D load distribution center position detection sensor 102, a value corresponding to the first-order moment about the X axis of the current density distribution of the total electric current, and a value corresponding to the first-order moment about the Y axis of the current density distribution based on the electric potentials of the nodes 161 to 166.

The total current $I_{all}$ is represented with using the electric potential $+V_0$ of the node 161, the electric potential $-V_0$ of the node 162, the electric potential $V_{a1}$ of the node 163, the electric potential $V_{a2}$ of the node 164, the electric potential $V_{b1}$ of the node 165, the electric potential $V_{b2}$ of the node 166, and the electric resistances $R_0$ of the resistors 167 to 170 by the following equation:

$$I_{all} = \frac{2V_0 - V_{a1} - V_{a2}}{R_0} = \frac{2V_0 + V_{b1} + V_{b2}}{R_0} \quad \text{[Equation 6]}$$

The value $I_x$ corresponding to the first-order moment about the X axis of the current density distribution is represented with using an appropriate constant a, a constant r, and a constant λ by the following equation:

$$I_x = a\left(\frac{\lambda}{R_0} + \frac{2}{r}\right)(V_{a1} - V_{a2}) \quad \text{[Equation 7]}$$

where the constant λ is represented by the following equation:

$$\lambda = m \div n$$

The value $I_y$ corresponding to the first-order moment about the Y axis of the current density distribution is represented by the following equation:

$$I_y = a\left(\frac{1}{R_0} + \frac{2\lambda}{r}\right)(V_{b1} - V_{b2})$$ [Equation 8]

The computer calculates the load based on the total current $I_{all}$, calculates the x coordinate value of the center position by dividing the value $I_x$ by the total current $I_{all}$, and calculates the y coordinate value of the center position by dividing the value $I_y$ by the total current $I_{all}$.

The computer further calculates a slip based on changes of the load and the center position with respect to time. The slip indicates whether or not the slip has occurred between an object on which the 2D load distribution center position detection sensor 102 is covered and another object which contacts the object via the 2D load distribution center position detection sensor 102. Methods for calculating the slip are known and the calculation method described in Japanese Laid-Open Patent Application JP-A-Heisei, 6-58239 can be applied, for example.

The computer further generates a screen showing the load, the center position, and the slip, and displays the screen on a display.

The 2D load distribution center position detection device 101 is used by covering a surface of an object with the 2D load distribution center position detection sensor 102. As such a surface, a surface of a robot (the bottom of a robot's foot or the ball of a robot's finger) and a floor surface of an architectural structure are exemplified. In the 2D load distribution center position detection sensor 102, the electric potentials of the nodes 163 to 166 change when a load is applied on the 2D load distribution center position detection sensor 102 during a constant voltage is applied between the node 161 and the node 162. Concretely, when a load is applied on the 2D load distribution center position detection sensor 102, loads L (i, j) are applied on the respective detection elements 111-(i, j) of the 2D load distribution center position detection sensor 102. An electric current I (i, j) passing from the A layer electrode 135 to the B layer electrode 136 via the pressure-sensitive material 139 in the detection element 111-(i, j) is represented by the following equation:

$$I(i, j) = \frac{V_a(i, j) - V_b(i, j)}{r_p} = k_0 p^c = k_0 f_z^c(i, j)$$ [Equation 9]

In this equation, the load L(i, j) is indicated by $r_p$, $V_a(i, j)$ is the electric potential of the A layer electrode 135 of the detection element 111-(i, j), $V_b(i, j)$ is the electric potential of the B layer electrode 136 of the detection element 111-(i, j), $k_0$ is an appropriate constant, and $f_z^c(i, j)$ is an appropriate function.

The total electric current $I_{all}$ is represented by a function of the summation of the loads L (i, j). The value $I_x$ and the value $I_y$ are represented with using a function $x_i$ of a parameter i and a function $y_j$ of a parameter j by the following equation:

$$I_x = \sum_{i=1}^{m}\sum_{j=1}^{n} x_i I(i, j), \quad I_y = \sum_{i=1}^{m}\sum_{j=1}^{n} y_j I(i, j)$$ [Equation 10]

FIG. 17 shows an example of a pressure distribution applied to the elastomer layer 107 in the case that a fine object which does not contact to, when the object is placed between adjoining two detection elements among a plurality of detection elements 111-(1, 1) to 111-(m, n), both of the two detection elements contacts to the 2D load distribution center position detection sensor 102. The pressure distribution 181 shows that the pressure applied to a range 182 in positions arranging the detection elements 111-(1, 1) to 111-(m, n) is 0 and that the pressure applied between the two detection elements shows a positive value.

FIG. 18 shows a pressure distribution applied to the sensor layer 108 when the pressure distribution 181 is applied to the elastomer layer 107. The pressure distribution 183 indicates that a range where the pressure shows positive value is broader than a range where a pressure shows positive value in the pressure distribution 181. The range includes a plurality of the ranges 182 on which the detection elements 111-(1, 1) to 111-(m, n) are arranged. FIG. 18 further shows a pressure applied to the detection elements 111-(1, 1) to 111-(m, n) when the pressure distribution 183 is applied to the sensor layer 108. Here, in the 2D load distribution center position detection sensor 102, in the case that the elastomer layer 107 does not included and the pressure distribution 181 is applied, a pressure is not applied to the detection elements 111-(1, 1) to 111-(m, n). However, in the 2D load distribution center position detection sensor 102, when the elastomer layer 107 is included and when the pressure distribution 181 is applied, a pressure is applied to the detection elements. Accordingly, the 2D load distribution center position detection sensor 102 can unfailingly detect a contact by an object smaller than a clearance between adjoining two detection elements.

Similar to the techniques described in Japanese Patent Publication No. 1308321 and Japanese Patent Publication No. 1875498, the controller 103 calculates a load acting on the 2D load distribution center position detection sensor 102 and the center position of the load. Concretely, the controller 103 measures electric potentials of the nodes 161 to 166. The controller 103 calculates the total electric current $I_{all}$ passing from the terminal 105-a1 or the terminal 105-a2 to the terminal 105-b1 or the terminal 105-b2 of the 2D load distribution center position detection sensor 102, a value corresponding to the first-order moment about the X axis of the current density distribution of the total electric current $I_{all}$, and a value corresponding to the first-order moment about the Y axis of the current density distribution based on the electric potentials of the nodes 161 to 166. The computer calculates the load based on the total electric current $I_{all}$, calculates the x coordinate value of its center position by dividing the value $I_x$ by the total electric current $I_{all}$, and calculates the y coordinate value of the center position by dividing the value $I_y$ by the total electric current $I_{all}$. The controller 103 further calculates a slip based on the change of the load and the center position with respect to time. The controller 103 further generates a screen showing the load, the center position, and the slip, and displays the screen on its display.

In addition, the power source device of the controller 103 can also apply a constant voltage between the node 161 and the node 162 so that a constant current can be supplied to the 2D load distribution center position detection sensor 102. On this occasion, the computer can calculate the load based on the voltage applied on the 2D load distribution center position detection sensor 102, calculate the x coordinate value of the center position due to the value $I_x$, and calculate the y coordinate value of the center position due to the value $I_y$.

That is to say, the 2D load distribution center position detection device 101 can calculate the load acting on the 2D load distribution center position detection sensor 102 and the center position of the load by using the 2D load distribution center position detection sensor 102 in the same manner to the

The invention claimed is:

1. A two dimensional load distribution center position detection device comprising:
   a two dimensional load distribution center position detection sensor comprising:
      a plurality of detection elements, wherein an electric resistance between a first electrode and a second electrode of each of the plurality of detection elements varies when a load is acted on; and
      a plurality of cables connecting adjoining detection elements among the plurality of detection elements, electrically connecting a first electrode of a first detection element of the adjoining detection elements to a first electrode of a second detection element of the adjoining detection elements via a first resistor, and electrically connecting a second electrode of the first detection element to a second electrode of the second detection element via a second resistor; and
   a controller,
   wherein the two dimensional load distribution center position detection sensor further comprises:
      a first terminal electrically connected to a first electrode of a detection element arranged in an end of a first direction of the plurality of detection elements;
      a second terminal electrically connected to a first electrode of a detection element arranged in an end of a direction opposite to the first direction of the plurality of detection elements;
      a third terminal electrically connected to a second electrode of a detection element arranged in an end of a second direction different from the first direction of the plurality of detection elements; and
      a forth terminal electrically connected to a second electrode of a detection element arranged in an end of a direction opposite to the second direction of the plurality of detection elements, and
   the controller is configured to apply a voltage between the first terminal, the second terminal, the third terminal and the forth terminal so that a current passes the two dimensional load distribution center position detection sensor, and to calculate a position of a load acted on the two dimensional load distribution center position detection sensor based on a current passing the first terminal, a current passing the second terminal, a current passing the third terminal and a current passing the forth terminal.

2. The two dimensional load distribution center position detection device according to claim 1, wherein each of the plurality of cables arc is deformable.

3. The two dimensional load distribution center position detection device according to claim 2, wherein the plurality of detection elements are arranged in lattice formation.

4. The two dimensional load distribution center position detection device according to claim 1, wherein the electric resistance is approximately inversely proportional to the load.

5. The two dimensional load distribution center position detection device according to claim 1, wherein the two dimensional load distribution center position detection sensor further comprises:
   an elastomer layer composed of an elastic material,
   wherein the elastomer layer covers a layer formed of the plurality of detection elements and the plurality of cables.

6. The two dimensional load distribution center position detection device according to claim 1, wherein the controller further configured to calculate the load based on the current passing the first terminal, the current passing the second terminal, the current passing the third terminal and the current passing the forth terminal.

7. The two dimensional load distribution center position detection device according to claim 1, wherein each of the plurality of detection elements includes:
   a substrate on whose surface the first electrode and the second electrode are arranged;
   a pressure-sensitive material connected to the first electrode and the second electrode, and
   the first electrode and the second electrode are sandwiched between the substrate and the pressure-sensitive material.

* * * * *